(12) United States Patent
Sullivan et al.

(10) Patent No.: US 10,428,216 B2
(45) Date of Patent: Oct. 1, 2019

(54) GOLF BALL INCORPORATING A MIXTURE OF A THERMOSET AND/OR THERMOPLASTIC COMPOSITION AND A PLURALITY OF CONDUCTIVE NANOSHELLED STRUCTURES

(71) Applicant: Acushnet Company, Fairhaven, MA (US)

(72) Inventors: Michael J. Sullivan, Old Lyme, CT (US); Brian Comeau, Berkley, MA (US); Erin C. McDermott, Providence, RI (US)

(73) Assignee: Acushnet Company, Fairhaven, MA (US)

( * ) Notice: Subject to any disclaimer, the term of this patent is extended or adjusted under 35 U.S.C. 154(b) by 18 days.

(21) Appl. No.: 15/687,617

(22) Filed: Aug. 28, 2017

(65) Prior Publication Data
US 2019/0062553 A1 Feb. 28, 2019

(51) Int. Cl.
*A63B 37/00* (2006.01)
*C08K 7/24* (2006.01)
*C08L 77/02* (2006.01)
*C08L 77/06* (2006.01)
*A63B 43/00* (2006.01)

(52) U.S. Cl.
CPC .......... *C08L 77/02* (2013.01); *A63B 37/0003* (2013.01); *A63B 37/0022* (2013.01); *A63B 37/0024* (2013.01); *A63B 37/0031* (2013.01); *A63B 37/0039* (2013.01); *A63B 37/0043* (2013.01); *A63B 37/0051* (2013.01); *A63B 37/0062* (2013.01); *A63B 37/0065* (2013.01); *A63B 37/0074* (2013.01); *A63B 37/0075* (2013.01); *A63B 37/0076* (2013.01); *A63B 37/0077* (2013.01); *A63B 37/0078* (2013.01); *A63B 37/0087* (2013.01); *A63B 43/004* (2013.01); *C08K 7/24* (2013.01); *C08L 77/06* (2013.01); *A63B 37/0058* (2013.01); *A63B 37/0059* (2013.01); *A63B 37/0082* (2013.01); *A63B 2037/0079* (2013.01); *C08L 2205/03* (2013.01)

(58) Field of Classification Search
None
See application file for complete search history.

(56) References Cited

U.S. PATENT DOCUMENTS

| 4,911,981 | A | * | 3/1990 | Schnur | A61K 9/1274 |
|---|---|---|---|---|---|
| | | | | | 252/513 |
| 6,710,114 | B2 | | 3/2004 | Bissonnette et al. | |
| 6,794,429 | B2 | | 9/2004 | Lacy | |
| 6,802,784 | B2 | | 10/2004 | Sullivan et al. | |
| 6,852,252 | B2 | | 2/2005 | Hales et al. | |
| 6,919,395 | B2 | | 7/2005 | Rajagopalan et al. | |
| 7,723,100 | B2 | | 5/2010 | Natan et al. | |
| 7,790,066 | B2 | | 9/2010 | Wang et al. | |
| 7,891,310 | B2 | | 2/2011 | Taylor et al. | |
| 8,217,143 | B2 | | 7/2012 | Kim et al. | |
| 8,758,167 | B2 | | 6/2014 | Morgan et al. | |
| 8,918,161 | B2 | | 12/2014 | Natan et al. | |
| 9,267,889 | B1 | | 2/2016 | Klopfer et al. | |
| 2003/0130061 | A1 | * | 7/2003 | Rajagopalan | A63B 37/08 |
| | | | | | 473/354 |
| 2004/0034122 | A1 | * | 2/2004 | Lacy | A63B 37/0003 |
| | | | | | 523/210 |

* cited by examiner

*Primary Examiner* — David J Buttner
(74) *Attorney, Agent, or Firm* — Margaret C. Barker

(57) ABSTRACT

Golf ball having CoR of at least 0.700 and compression of at least 50 and comprising a layer of a mixture of thermoset or thermoplastic composition and a plurality of conductive nanoshelled structures such as conductive hollow nanoshells and/or nanorice particles. Conductive nanoshelled structures may be included in amount of from about 2 wt % to greater than 50 wt. % of total weight of mixture. Diameter of each conductive nano shelled structure at widest cross-section may be up to 1000 nm. Each conductive hollow nanoshell may have shell thickness to longitudinal diameter ratio of from about 1:3 to about 1:100. Each nanorice particle may have longitudinal diameter of up to 1000 nm. Shell thickness can be from 1 nm to 100 nm and may be controlled. A layer consisting of mixture may have specific gravity that differs from specific gravity of a layer consisting of the thermoset or thermoplastic composition portion of mixture.

15 Claims, No Drawings

GOLF BALL INCORPORATING A MIXTURE OF A THERMOSET AND/OR THERMOPLASTIC COMPOSITION AND A PLURALITY OF CONDUCTIVE NANOSHELLED STRUCTURES

FIELD OF THE INVENTION

Golf balls comprising polymer compositions incorporating nanostructures that are easily dispersible therein.

BACKGROUND OF THE INVENTION

Conventional golf balls can be divided into two general classes: solid and wound. Solid golf balls include one-piece, two-piece (i.e., single layer core and single layer cover), and multi-layer (i.e., solid core of one or more layers and/or a cover of one or more layers) golf balls. Wound golf balls typically include a solid, hollow, or fluid-filled center, surrounded by a tensioned elastomeric material, and a cover.

Examples of golf ball materials range from rubber materials, such as balata, styrene butadiene, polybutadiene, or polyisoprene, to thermoplastic or thermoset resins such as ionomers, polyolefins, polyamides, polyesters, polyurethanes, polyureas and/or polyurethane/polyurea hybrids, and blends thereof. Typically, outer layers are formed about the spherical outer surface of an innermost golf ball layer via compression molding, casting, or injection molding.

From the perspective of a golf ball manufacturer, it is desirable to have materials exhibiting a wide range of properties, such as compression, coefficient of restitution (CoR), spin, and "feel" because this enables the manufacturer to make and sell golf balls suited to differing levels of ability and/or preferences. In this regard, the industry has previously explored incorporating nano-sized sturctures such as nanofibers, nanotubes, and nanoparticles in golf ball compositions in order to alter or adjust properties such as specific gravity, modulus, and/or tensile strength.

However, golf ball manufacturers have observed that nanostructures are difficult to disperse throughout golf ball polymer compositions and form agglomerations. See, e.g., Sullivan et al., U.S. Pat. No. 8,758,167 ("Sullivan '167"). Agglomeration of nanostructures within a polymeric matrix can interfere with molding of the composition into a golf ball component as well as negatively impact the resulting characteristics of the finished golf ball.

Sullivan '167 proposes improving nanostructure dispersibility and avoiding agglomeration by "substantially orienting" nanostructures within the golf ball composition. Sullivan '167 specifies orienting at least 10%, at least 25%, at least 50%, at least 75%, at least 90% or more of the nanostructures of each set or cluster of nanostructures relative to a designated axis, plane, surface or three dimensional space. Sullivan '167 further specifies that the orienting can be substantially parallel, substantially perpendicular, or at a selected angle (for example, about 15°, 30°, 45°, or 60°). Moreover, each set of nanostructures can include splayed or angularly-gathered nanostructures (for example, star patterns or hexagonal groupings) as well as substantially aligned populations of nanostructures and as described in Whiteford et al., U.S. Pat. No. 7,662,313.

Unfortunately, substantially orienting nanostructures in golf ball compositions increases the margin for error on the assembly line and raises manufacturing costs. Accordingly, there remains a need for golf balls that include nanostructures which disperse within a golf ball composition without orienting. Such improved golf balls, if meanwhile producible within existing manufacturing processes and which can improve a wide range of golf ball properties would be particularly useful, efficient and cost effective. The current golf balls of the invention and methods for making same advantageously address and solve these needs.

SUMMARY OF THE INVENTION

Golf balls of the invention have a CoR of at least 0.700 and a compression of at least 50 and comprise at least one layer consisting of a mixture of thermoset or thermoplastic composition and a plurality of conductive nanoshelled structures. In one embodiment, the conductive nanoshelled structures may be selected from the group consisting of conductive hollow nanoshells and nanorice particles.

In one embodiment, the plurality of conductive nanoshelled structures may be included in the mixture in an amount of from about 2 wt % to about 50 wt % of the total weight of the mixture. In another embodiment, the plurality of conductive nanoshelled structures may be included in the mixture in an amount of from about 2 wt % to about 10 wt %, or from 2 wt % to 10 wt %, or from about 10 wt % to about 35 wt % of the total weight of the mixture. In yet another embodiment, the plurality of conductive nanoshelled structures may be included in the mixture in an amount of from about 25 wt % to about 75 wt % of the total weight of the mixture.

In different embodiments, the plurality of conductive nanoshelled structures may be included in the mixture in an amount greater than 30 wt % of the total weight of the mixture, or from 35 wt % to about 75 wt % of the total weight of the mixture, or from about 35 wt % to 75 wt % of the total weight of the mixture, or in an amount of at least 50 wt % of the total weight of the mixture.

Each conductive nanoshelled structure may have a diameter, at its widest cross-section, of up to 1000 nm. In a specific embodiment, each conductive hollow nanoshell may have a shell thickness to longitudinal diameter ratio of from about 1:3 to about 1:100. In another specific embodiment, each nanorice particle may have a longitudinal diameter of up to 1000 nm and a shell thickness of from 1nm to 100 nm.

In some embodiments, the mixture may have a specific gravity that is less than a specific gravity of the thermoset or thermoplastic composition.

In one embodiment, at least half of the conductive nanoshelled structures have a shell having uniform thickness. In another embodiment, at least half of the conductive nanoshelled structures have a shell having non-uniform thickness.

In one specific embodiment, the thermoset or thermoplastic composition consists of a thermoset polybutadiene-based and peroxide-cured rubber and the conductive nanoshelled structures are zinc oxide nanoshells, magnesium oxide nanoshells, or combinations thereof. In another specific embodiment, the thermoset or thermoplastic composition consists of an acid functional polymer-based ionomer and the conductive nanoshelled structures have surface cations selected from the group consisting of zinc, sodium, magnesium, lithium, potassium, and combinations thereof. In yet another specific embodiment, the thermoset or thermoplastic composition consists of at least one of a polyurethane, a polyurea, or a polyurethane/polyurea hybrid, and the conductive nanoshelled structures are hollow nanoshells.

In one embodiment, the at least one layer comprises an inner core having a geometric center Shore C hardness of from about 40 to about 80 and a first outer surface Shore C hardness of from about 50 to about 98. In a particular embodiment, the inner core may have a compression of from about 5 to about 95.

In another embodiment, the at least one layer may comprise an outer core layer having a second outer Shore C surface hardness of from about 50 to about 98. In yet another embodiment, the at least one layer may comprise an intermediate layer having a Shore D hardness of from about 30 to about 78. In still another embodiment, the at least one layer may comprise a cover layer having a cover hardness of 60 Shore D or greater. Alternatively or additionally, the at least one layer may comprise a cover layer having a cover hardness of 25 Shore D to about less than 60 Shore D.

In one specific golf ball construction, the golf ball may have a CoR of at least 0.700 and a compression of at least 50 and comprise a first layer and a second layer adjacent to the first layer. The first layer may consist of a first mixture consisting of a first amount of a thermoset or thermoplastic composition and a plurality of conductive hollow nanoshells; while the second layer consists of a second mixture consisting of a second amount of thermoset or thermoplastic composition and a plurality of conductive nanoshelled structures. The first layer may have a first specific gravity that is different than a second specific gravity of the second layer to create a specific gravity gradient between the first layer and the second layer.

In one such embodiment, the first specific gravity may be less than the second specific gravity. In one such embodiment, the plurality of conductive nanoshelled structures of the second mixture consists of nanorice particles. In another such embodiment, the plurality of conductive nanoshelled structures of the second mixture consists of conductive hollow nanoshells and nanorice particles.

Meanwhile, in one such embodiment, the conductive hollow nanoshells may be included in the first mixture in an amount that is substantially similar to an amount of conductive hollow nanoshells included in the second mixture. In an alternative such embodiment, the conductive hollow nanoshells may be included in the first mixture in an amount that is greater than an amount of conductive hollow nanoshells included in the second mixture.

In other embodiments, the conductive hollow nanoshells may be included in the first mixture in an amount that is substantially similar to an amount of conductive nanoshelled structures included in the second mixture.

In one embodiment, the first amount of thermoset or thermoplastic composition and the second amount of thermoset or thermoplastic composition are substantially similar.

In an alternative embodiment, the inventive golf ball comprises at least one coating layer consisting of a coating mixture of a base coating composition portion and a plurality of conductive nanoshelled structures.

In one embodiment, the base coating composition portion may consist of at least one of a latex, a lacquer, and an enamel. In a particular embodiment, the base coating composition portion may consist of at least one of a urethane, an acrylic, an epoxy, a urethane acrylate, and an alkyd.

Such golf balls may have an overall color appearance $C_{OA}$ having a color stability difference $\Delta E_{cmc}$ as measured in the CIELAB color space in a QUV after 24 hrs. that is less than 5.0. In another such embodiment, the color stability difference $\Delta E_{cmc}$ as measured in the CIELAB color space in a QUV after 24 hrs. is less than 2.0. In yet another such embodiment, the color stability difference $\Delta E_{cmc}$ as measured in the CIELAB color space in a QUV after 24 hrs. is less than 1.5.

Such a coating of inventive mixture may have an acceptability decision of pass whereas the coating composition portion of the mixture has an acceptability decision of fail.

DETAILED DESCRIPTION

Golf balls of the invention have a CoR of at least 0.700 and a compression of at least 50 and incorporate at least one layer consisting of a mixture of thermoset or thermoplastic composition and a plurality of conductive nanoshelled structures. Advantageously, the plurality of conductive nanoshelled structures readily disperse throughout golf ball thermoset or thermoplastic compositions due to unique surface properties without being oriented within the thermoset or thermoplastic composition such as relative to a designated axis, plane, surface or three dimensional space. Meanwhile, a finished golf ball incorporating a layer of inventive mixture is desirably and necessarily durable to withstand the great force and blow of a club face striking the golf ball on the course.

As used herein, the term "conductive nanoshelled structures" refers to nanostructures containing a conductive shell, and includes for example conductive hollow nanoshells and nanorice particles such as described and detailed in *Formation and Stability of Hollow MgO Nanoshells*, Gopi Krishnan, G. Palasantzas, and B. J. Looi, Journal of Nanoscience and Nanotechnology, Vol. 10, pp. 104 (2010) ("*Hollow MgO Nanoshells*"); U.S. Pat. No. 8,217,143 of Kim et al. ("Kim 143"); and U.S. Pat. No. 8,217,143 of Wang et al. ("Wang"), each of which is hereby incorporated by reference herein in its entirety.

Meanwhile, the term "conductive" refers to atoms having outer electrons that are loosely bound and free to move through a material.

Due at least in part to such conductive properties, combined with a unique nanoshelled contruction, each conductive nanoshelled particle of the plurality can interact with and readily disperse within the ingredients of a thermoset or thermoplastic composition portion of the mixture rather than agglomerating with other conductive nanoshelled particles. A strong polymer network is thereby created within the resulting polymer mixture with excellent intra-layer adhesion and cohesion and also displaying improved optical properties.

This conductive shell may (i) form within the inner surface of a molecule and encase a hollow space; and/or (ii) surround a nanoparticle core which may be solid or partially hollow.

In conductive shell construction (i), a void is formed in the center of a molecule when metal or otherwise conductive ions diffuse outward from the center faster than inward diffusion of vacancies, and the metal or otherwise conductive ions remaining in the center form a conductive shell about the resulting hollow center. Suitable examples of conductive hollow nanoshells for incorporating in the inventive mixture of golf balls of the invention are set forth in Hollow MgO Nanoshells and Kim '143, previously incorporated by reference herein in their entireties.

One particular example of a suitable conductive hollow nanoshell includes the hexagonally shaped hollow MgO nanoshells discussed in the Hollow MgO Nanoshells article, which, due to its construction, can easily and readily disperse within a thermoset or thermoplastic composition without being oriented since agglomeration of the hollow MgO nanoshells in the resulting mixture is substantially avoided.

Another particular example of a suitable conductive hollow nanoshell of construction type (i) includes a plurality of apoferritin molecules having empty core shells in which a substantially integral conductive nanoshell is formed. This occurs because the number of metal or otherwise conductive ions entering the hollow core is controlled to be sufficient to form the substantially integral conductive nanoshell but insufficient to completely fill the space and therefore will not form a spherical conductive core in the empty space. In this example, examples of suitable metal or otherwise conductive ions are of transition metals such as cobolt, iron, manganese, vanadium, nickel, zinc, copper or silver.

Conductive hollow nanoshells may be fabricated, for example, by admixing an aqueous solution of metal or otherwise conductive ions with an aqueous solution of apoferritin protein molecules, followed by admixing an aqueous solution containing an excess of an oxidizing agent for the metal or otherwise conductive ions. The apoferritin molecules serve as bio-templates for the formation of metal or otherwise conductive nanoshells, which form on and are bonded to the inside walls of the hollow cores of the individual apoferritin molecules. The number of metal or otherwise conductive atoms entering the hollow core of each individual apoferritin molecule may be controlled such that a hollow metal or otherwise conductive nanoshell results rather than formation of a solid spherical metal or otherwise conductive nanoparticle.

The thickness of the conductive shell can also be targeted by so controlling the number of metal or otherwise conductive ions entering the hollow core, with the limitation being that the number of metal or otherwise conductive ions entering the hollow core should be less than the amount that would completely fill the hollow core. Thus, the diameter of the hollow portion of a conductive hollow nanoshell will be less than the diameter of the core.

Hollow nanoshelled structures can be prepared by methods such as thermal evaporation, emulsion/water extraction techniques, hydrothermal approach and the template method and as otherwise set forth in the Hollow MgO Nanoshells article and Kim '143.

Meanwhile, in conductive nanoshelled structures of type (ii) (e.g., nanorice particles), a conductive shell coats or otherwise surrounds a nanostructure core. The core may be solid or partially hollow. When solid, the core may comprise a dielectric material. Examples include solid cores comprising a metal oxide, iron, cadmium, electric insulators, silicon dioxide, titanium dioxide, polymethyl methacrylate (PMMA), polystyrene, gold sulfide, macromolecules such as dendrimers, semiconductor materials, colloidal silica, or combinations thereof.

Meanwhile, the shell may comprise any conductive material such as gold, silver, copper, aluminum, titanium, or chromium. Embodiments are also envisioned wherein the core is surrounded by two or more shells. In such multi-shell embodiments, the shells can be formed of the same or different conductive materials. In other embodiments, one shell may be formed of a conductive material whereas an adjacent shell is formed of a non-conductive material.

Each nanorice particle has an aspect ratio which may be targeted by controlling the thickness of the conductive shell. For example, the shell may be thinner or thicker, and/or the shell may have a uniform thickness or a non-uniform thickness. In an embodiment wherein the shell thickness is non-uniform, in a particular embodiment, the shell thickness may taper from an equatorial region to a polar region, or vice versa.

Nanorice particles combine the intense local fields of nanorods with the highly tunable plasmon resonances of nanoshells. This geometry possesses far greater structural tunability than previous nanoparticle geometries, along with much larger local field enhancements and far greater sensitivity as a surface plasmon resonance (SPR) nanosensor than presently known dielectric-conductive material nanostructures. Nanorice nanoparticles may have a surface plasmon resonance sensitivity ranging from about 100 nm $RIU^{-1}$ (refractive index unit) to about 1500 $RIU^{-1}$, or from about 300 nm $RIU^{-1}$ to about 1200 $RIU^{-1}$, or from about 600 nm $RIU^{-1}$ to about 1000 $RIU^{-1}$. Conductive shell thickness can be varied to adjust the surface plasmon resonance sensitivity. The aspect ratio of the core or the aspect ratio of the nanorice particle as a whole may be adjusted (while the other remains unadjusted) to tune the surface plasmon resonance.

It is envisioned that each conductive nanoshelled structure may have a diameter, at its widest cross-section, of up to 1000 nm, or from about 2 nm to 1000 nm, or from about 2 nm to 10 nm, or from about 10 nm to 1000 nm, or from about 100 nm to about 800 nm, or from about 200 nm to about 500, or from about 10 nm to about 250 nm, or from 20 nm to about 100 nm, or from about 1 nm to about 500 nm.

The thickness of the shell of each conductive nano shelled structure can for example be within the range of from about 1 nm to about 100 nm, or from about 5 nm to about 50 nm, or from about 10 nm to about 40 nm. Non-limiting examples of how nanorice particles can be formed are set forth in the '066 patent.

A plurality of conductive nanoshelled structures may be mixed with a thermoset or thermoplastic composition prior to molding or otherwise being formed into a golf ball within any known golf ball manufacturing process. The plurality of conductive nanoshelled structures may in at least some embodiments be pre-mixed with one or more ingredients of the thermoset or thermoplastic composition formulation. In particular embodiments, the plurality of conductive nanoshelled structures may be mixed with the thermoset or thermoplastic composition (or pre-mixed with some ingredients thereof) under high shear conditions.

A plurality of conductive nanoshelled structures meanwhile has multifunctional versatility to target and improve a wide range of golf ball properties/characteristics without meanwhile negatively impacting durability. For example, zinc oxide or magnesium oxide nanoshells may be used as activators and/or accelerators in peroxide cured polybutadiene formulations.

In another example, hollow nanoshells having zinc, sodium, magnesium, lithium, potassium, or other cation on the surface thereof may serve as a neutralizing agent to form an ionmer from an acid functional polymer such as an ethylene-(meth) acrylic acid copolymer.

In yet another example, conductive nanoshelled structures can be incorporated to target specific gravity in rubber compositions, polyurethanes, polyureas, polyurethane/polyurea hybrids, and/or HNPs. In this regard, specific gravity of a layer is an important property because it can impact characteristics of the golf ball such as Moment of Inertia (MOI).

Meanwhile, conductive nanoshelled structures can be added as antioxidants, antiozonants and/or UV absorbers to preserve or promote the light emitting and/or light absorbing characteristics of golf ball materials which are vulnerable to deterioration when exposed to UV light on the course and produce an $\Delta Ecmc$ very close to 1—which is desirable, since the human eye generally cannot perceive color changes or differences within the CIELAB color space where the golf ball's color appearance has a color stability difference $\Delta Ecmc<1$.

In one embodiment, the plurality of conductive nanoshelled structures may be included in the inventive mixture in an amount of from about 2 wt % to about 50 wt %, or from about 2 wt % to about 10 wt %, or from 2 wt % to 10 wt % of the total weight of the mixture. In another embodiment, the plurality of conductive nanoshelled structures may be included in the inventive mixture in an amount of from about 10 wt % to about 35 wt %, or from 10 wt % to about 35 wt %, or from about 10 wt % to 35 wt %, or from 10 wt % to 35 wt % of the total weight of the mixture. In yet another embodiment, the plurality of conductive nanoshelled structures may be included in the inventive mixture in an amount of from about 25 wt % to about 75 wt %, or from 25 wt % to about 75 wt %, or from about 25 wt % to 75 wt %, or from 25 wt % to 75 wt % of the total weight of the mixture. In still another embodiment, the plurality of conductive nanoshelled structures may be included in the inventive mixture in an amount of at least 50 wt % of the total weight of the mixture.

In other embodiments, the plurality of conductive nanoshelled structures may be included in the inventive mixture in an amount ranging from about 2 wt % to about 15 wt % of the total weight of the mixture, or from about 10 wt % to about 40 wt % of the total weight of the mixture, or in an amount greater than 50 wt % of the total weight of the mixture, or in an amount greater than 5 wt % of the total weight of the mixture.

In a specific embodiment, each conductive hollow nanoshell may have a shell thickness to longitudinal diameter ratio of from about 1:3 to about 1:100. In other embodiments, each conductive hollow nanoshell may have a shell thickness to longitudinal diameter ratio of from about 1:3 to about 1:1000, or from about 1:3 to about 1:750, or from about 1:3 to about 1:500, or from about 1:3 to about 1:250, or from about 1:3 to about 1:150.

In another specific embodiment, each nanorice particle may have a longitudinal diameter of up to 1000 nm and a shell thickness of from 1nm to 100 nm.

In a particular embodiment, the mixture has a specific gravity that is less than a specific gravity of the thermoset or thermoplastic composition. In one embodiment, the plurality of conductive nanoshelled structures may be included in the mixture in an amount such that the layer has a specific gravity of from 0.5 to about 10.0 and greater than a specific gravity of the thermoset or thermoplastic composition. In another embodiment, the plurality of conductive nanoshelled structures may be included in the mixture in an amount such that the layer has a specific gravity of from 0.5 to less than 1.05. In yet another embodiment, the plurality of conductive nanoshelled structures may be included in the mixture in an amount such that the layer has a specific gravity of from 1.05 to 1.50. In still another embodiment, the plurality of conductive nanoshelled structures may be included in the mixture in an amount such that the layer has a specific gravity of greater than 1.50. In an alternative embodiment, the plurality of conductive nanoshelled structures is included in the mixture in an amount such that the layer has a specific gravity of from 5.0 to about 10.0.

In a particular embodiment, the plurality of conductive nanoshelled structures creates a specific gravity gradient within the layer. In a different embodiment, the plurality of conductive nanoshelled structures may be included in the mixture of one layer in an amount such that the layer has a specific gravity that is different than a specific gravity of another layer of the golf ball.

In one specific golf ball construction, the golf ball may have a CoR of at least 0.700 and a compression of at least 50 and comprise a first layer and a second layer adjacent to the first layer. The first layer may consist of a first mixture consisting of a first amount of a thermoset or thermoplastic composition and a plurality of conductive hollow nanoshells; while the second layer consists of a second mixture consisting of a second amount of thermoset or thermoplastic composition and a plurality of conductive nanoshelled structures. The first layer may have a first specific gravity that is different than a second specific gravity of the second layer to create a specific gravity gradient between the first layer and the second layer.

In one such embodiment, the first specific gravity may be less than the second specific gravity. In one such embodiment, the plurality of conductive nanoshelled structures of the second mixture consists of nanorice particles. In another such embodiment, the plurality of conductive nanoshelled structures of the second mixture consists of conductive hollow nanoshells and nanorice particles.

Meanwhile, in one such embodiment, the conductive hollow nanoshells may be included in the first mixture in an amount that is substantially similar to an amount of conductive hollow nanoshells included in the second mixture. In an alternative such embodiment, the conductive hollow nanoshells may be included in the first mixture in an amount that is greater than an amount of conductive hollow nanoshells included in the second mixture.

In other embodiments, the conductive hollow nanoshells may be included in the first mixture in an amount that is substantially similar to an amount of conductive nanoshelled structures included in the second mixture.

In one embodiment, the first amount of thermoset or thermoplastic composition and the second amount of thermoset or thermoplastic composition are substantially similar.

In an alternative embodiment, the inventive golf ball comprises at least one coating layer consisting of a coating mixture of a base coating composition portion and a plurality of conductive nanoshelled structures.

In one embodiment, the base coating composition portion may consist of at least one of a latex, a lacquer, and an enamel. In a particular embodiment, the base coating composition portion may consist of at least one of a urethane, an acrylic, an epoxy, a urethane acrylate, and an alkyd.

Such golf balls may have an overall color appearance $C_{OA}$ having a color stability difference $\Delta E_{cmc}$ as measured in the CIELAB color space in a QUV after 24 hrs. that is less than 5.0. In another such embodiment, the color stability difference $\Delta E_{cmc}$ as measured in the CIELAB color space in a QUV after 24 hrs. is less than 2.0. In yet another such embodiment, the color stability difference $\Delta E_{cmc}$ as measured in the CIELAB color space in a QUV after 24 hrs. is less than 1.5.

The human eye generally cannot perceive color changes or differences within the CIELAB color space where the golf ball's color appearance has a color stability difference $\Delta Ecmc<1$. This is called perceptibility of color difference. Accordingly, golf ball manufacturers desire to make golf balls having components that are formed of light-stable materials producing such results. Inventive golf balls incorporating coatings consisting of the mixtures disclosed and claimed herein can produce a color appearance that achieves a 24 hour color stability difference $\Delta Ecmc$ that is desirably and synergistically closer to the $\Delta Ecmc$ target <1 than a coating consisting of the thermoset or thermoplastic composition (without the plurality of conductive nanoshelled structures) and meanwhile without sacrificing durability.

Such testing can be done in an accelerated weathering tester (QUV) equipped with a UVA bulb. A cycle can be specified at 4 hours of lamp on at 1.5 Watts/m²@50° C. followed by 4 hours off @40° C. with condensation. Subsequently, the golf balls can be exposed for a 24 hour QUV cycle and then measured for color. Color values L*, a*, b*, C*and h° before (initial color) and after QUV testing can be compared (ΔL*cmc., ΔC*cmc, ΔH*cmc) and $\Delta E_{cmc}$ determined.

In addition, a coating composition of inventive mixture may have greater acceptability than the base coating composition portion of the mixture without a plurality of conductive nanoshelled structures. Acceptability is how an observer subjectively interprets a color difference when looking at it. Acceptability is determined by a viewer looking at a color and deciding whether the color is acceptable, in which case the ball "passes" or "fails" for color appearance. Two given golf balls may have the same perceptibility based on the test above yet acceptability judgments can be different. And in a particular embodiment, a golf ball incorporating the inventive coating mixture has an acceptability decision of pass while the coating composition portion of the mixture has an acceptability decision of fail, regardless of the perceptibility of these two golf balls.

The invention also relates to a method of making a golf ball comprising: providing a thermoset or thermoplastic composition; providing a plurality of conductive nanoshelled structures; forming a mixture by mixing the thermoset or thermoplastic composition and the plurality of conductive nanoshelled structures; and forming a golf ball having a CoR of at least 0.700 and a compression of at least 50 wherein at least one layer consists of the mixture.

In another embodiment, the invention relates to a method of making a golf ball comprising providing a plurality of ingredients for a thermoset or thermoplastic composition; combining at least one of the ingredients with a plurality of conductive nanoshelled structures and forming a premixture; mixing the premixture with at least one other ingredient of the thermoset or thermoplastic composition and forming a mixture; and forming a golf ball having a CoR of at least 0.700 and a compression of at least 50 wherein at least one layer consists of the mixture.

A golf ball of the invention incorporating at least one layer of inventive mixture is durable to withstand the great force of a club striking the golf ball without cracking or otherwise breaking due at least in part to the benefits of the layer of inventive mixture.

It is contemplated that the thermoset or thermoplastic composition itself may be made using at least the ingredients disclosed herein for forming rubber-based compositions, polyurethanes, polyureas, polyurethane/polyurea hybrids, polyurethane foams, polyurea foams, polyurethane/polyurea hybrid foams, ionomers, or combinations thereof. In some embodiments, the thermoset or thermoplastic composition portion of the inventive mixture comprises at least one of a thermoset rubber, thermoset polyurethane, a thermoplastic polyurethane, a polyurea, or an ionomer. In other embodiments, the thermoset or thermoplastic composition portion of the inventive mixture consists of one of a thermoset rubber, thermoset polyurethane, a thermoplastic polyurethane, a polyurea, or an ionomer. Examples of suitable thermoset and thermoplastic compositions are detailed below.

A golf ball of the invention may incorporate one or more layers of inventive mixture and in a wide range of different constructions so long as the finished golf ball produces desired overall playing characteristic and the finished golf ball has a CoR of at least about 0.700 and golf ball compression of at least about 50.

Golf balls of the invention can be of any size, although the USGA requires that golf balls used in competition have a diameter of at least 1.68 inches. For play outside of United States Golf Association (USGA) rules, the golf balls can be of a smaller size. Normally, golf balls are manufactured in accordance with USGA requirements and have a diameter in the range of about 1.68 to about 1.80 inches. Also, the USGA has established a maximum weight of 45.93 g (1.62 ounces) for golf balls. For play outside of USGA rules, the golf balls can be heavier. Thus, the diameter of the golf balls may be, for example, from about 1.680 inches to about 1.800 inches, or from about 1.680 inches to about 1.760 inches, or from about 1.680 inches (43 mm) to about 1.740 inches (44 mm), or even anywhere in the range of from 1.700 to about 1.950 inches.

The diameter and thickness of layers of golf balls of the invention, along with properties such as hardness and compression, may vary depending upon the desired playing performance properties of the golf ball such as spin, initial velocity, and feel. The term, "layer", as used herein, means generally any spherical portion of the golf ball and even includes a very thin moisture barrier film layer, although a very thin moisture barrier film layer should not negatively impact or otherwise alter golf ball playing characteristics.

Advantageously, the inventive layer of inventive mixture may be formed in a wide range of physical properties and playing characteristics, and hardness, compression, resilience or CoR, modulus, tensile strength, etc. can be modified to target for example spin, distance, etc. Accordingly, the dimensions of each golf ball component such as the diameter of the core and respective thicknesses of the intermediate layer(s), cover layer(s) and/or coating layer(s) may also be selected and coordinated as known in the art for targeting and achieving such desired playing characteristics or feel.

In this regard, cores in a golf ball of the invention may for example be solid, semi-solid, fluid-filled, or hollow, and may have a single-piece or multi-piece structure. The overall diameter of the core and all intermediate layers is often about 80 percent to about 98 percent of the overall diameter of the finished ball. A variety of materials may be used to make a core including thermoset compositions such as rubber, styrene butadiene, polybutadiene, isoprene, polyisoprene, trans-isoprene; thermoplastics such as ionomer resins, polyamides or polyesters; and thermoplastic and thermoset polyurethane and polyurea elastomers.

In one embodiment, the core is a single-piece made from a natural or synthetic rubber composition such as polybutadiene. In other instances, a two-piece core is constructed; that is, there may be two core layers. For example, an inner core portion may be made of a first base rubber material and an outer core layer, which surrounds the inner core, may be made of a second base rubber material. The respective core pieces may be made of the same or different rubber materials. Cross-linking agents and fillers may be added to the rubber materials.

A golf ball of the invention may for example be a two-piece golf ball, wherein a layer of inventive mixture is formed about a core. Embodiments are indeed also envisioned wherein a golf ball of the invention may have three layers, wherein one or more of the layers is a layer of inventive mixture. Of course, four layer golf balls are also envisioned, wherein at least one of the layers is a cast layer of thermoset polymer mixture. Meanwhile, embodiments are also envisioned wherein the at least one layer of inventive mixture is a spherical inner core.

In one embodiment, the at least one layer comprises an inner core having a geometric center Shore C hardness of from about 40 to about 80 and a first outer surface Shore C hardness of from about 50 to about 98. In a particular embodiment, the inner core may have a compression of from about 5 to about 95.

In another embodiment, the at least one layer may comprise an outer core layer having a second outer Shore C surface hardness of from about 50 to about 98. In a different embodiment, the at least one layer may be a core layer wherein the thermoset or thermoplastic composition of the mixture is a thermoset rubber composition, wherein the layer has a surface hardness of from about 45 Shore C to about 95 Shore C and greater than a Shore C surface hardness of a layer consisting of the thermoset rubber composition.

In yet another embodiment, the at least one layer may comprise an intermediate layer having a Shore D hardness of from about 30 to about 70. In still another embodiment, the at least one layer may comprise a cover layer having a cover hardness of 60 Shore D or greater. Alternatively or additionally, the at least one layer may comprise a cover layer having a cover hardness of 25 Shore D to about less than 60 Shore D.

In a particular embodiment, a golf ball of the invention may have a CoR of at least 0.700 and an Atti compression of at least about 50. The golf ball comprises a core comprising a rubber composition and having a diameter of at least 1.3 inches and a compression of from about 15 to about 60; and a cover layer having a thickness of from about 0.010 inches to about 0.045 inches and a hardness of from about 30 Shore D to about 75 Shore D and consisting of a mixture of a thermoset or thermoplastic composition, comprising at least one of a thermoset polyurethane, a thermoplastic polyurethane, a polyurea or an ionomer, and a plurality of conductive nanoshelled structures.

Golf ball layers formed of the inventive mixture of the invention may have a wide range of Shore D hardnesses, for example, a hardness of from about 20 Shore D to about 75 Shore D. In one embodiment, a layer formed of the inventive mixture of the invention may have a hardness of from about 30 Shore D to about 65 Shore D. In another embodiment, a layer formed of the inventive mixture of the invention may have a hardness of from about 40 Shore D to about 60 Shore D. In yet another embodiment, a layer formed of the inventive mixture of the invention may have a hardness of from about 50 Shore D to about 75 Shore D. Embodiments are also indeed envisioned wherein a layer formed of the inventive mixture of the invention may have a hardness of up to 80 Shore D. In some embodiments, the Shore D hardness of a layer formed of the inventive mixture of the invention may be greater than about 50. In other embodiments, a layer formed of the inventive mixture of the invention may have a Shore D hardness of about 50 or less.

Golf ball layers formed of the inventive mixture of the invention may alternatively have a hardness of from about 45 Shore C to about 98 Shore C. In one embodiment, a layer formed of the inventive mixture of the invention may have a hardness of from about 50 Shore C to about 85 Shore C. In another embodiment, a layer formed of the inventive mixture of the invention may have a hardness of from about 60 Shore C to about 90 Shore C. In yet another embodiment, a layer formed of the inventive mixture of the invention may have a hardness of from about 65 Shore C to about 85 Shore C. Embodiments are also indeed envisioned wherein a layer formed of the inventive mixture of the invention may have a hardness of up to 85 Shore C. In some embodiments, the Shore C hardness of a layer formed of the inventive mixture of the invention may be greater than about 70. In other embodiments, a layer formed of the inventive mixture of the invention may have a Shore C hardness of about 70 or less.

In one embodiment, the at least one layer is a coating of inventive mixture having a Sward rocker hardness of about 5 or greater and greater than a Sward rocker hardness of the thermoset or thermoplastic composition itself.

In another embodiment, the inventive coating has a Sward rocker hardness of about 10 or greater. In yet another embodiment, the at least one layer is a coating having a Sward rocker hardness of from about 30 to 80 and greater than a Sward rocker hardness of a coating consisting of the thermoset or thermoplastic composition. In alternative embodiments, the at least one layer is a coating having Sward rocker hardness of from about 40 to 70, or from about 45 to 60, and each being greater than a Sward rocker hardness of a coating consisting of the thermoset or thermoplastic composition. Sward rocker hardness may be ascertained via ASTM D 2134.

The coating of inventive mixture may have a pencil hardness of 3H or less and greater than a pencil hardness of a coating consisting of the thermoset or thermoplastic composition. The inventive coating may have a pencil hardness of HB or less and greater than a pencil hardness of a coating consisting of the thermoset or thermoplastic composition. The inventive coating may have a pencil hardness of from about 3H to about 7H and greater than a pencil hardness of a coating consisting of the thermoset or thermoplastic composition. Pencil hardness testing may be performed according to ASTM D3363.

In golf ball layers, the thermoset or thermoplastic composition portion of the mixture may be a thermoset rubber composition including at least one thermoset base rubber, such as a polybutadiene rubber, cured with at least one peroxide and at least one reactive co-agent, which can be a metal salt of an unsaturated carboxylic acid, such as acrylic acid or methacrylic acid, a non-metallic coagent, or mixtures thereof. Preferably, a suitable antioxidant is included in the composition. An optional soft and fast agent (and sometimes a cis-to-trans catalyst), such as an organosulfur or metal-containing organosulfur compound, can also be included in the rubber composition formulation.

Other ingredients that are known to those skilled in the art may be used, and are understood to include, but not be limited to, density-adjusting fillers, process aides, plasticizers, blowing or foaming agents, sulfur accelerators, and/or non-peroxide radical sources.

The base thermoset rubber, which can be blended with other rubbers and polymers, typically includes a natural or synthetic rubber. A preferred base rubber is 1,4-polybutadiene having a cis structure of at least 40%, or greater than 80%, and even greater than 90%.

Examples of desirable polybutadiene rubbers include BUNA® CB22 and BUNA® CB23, commercially available from LANXESS Corporation; UBEPOL® 360L and UBEPOL® 150L and UBEPOL-BR rubbers, commercially available from UBE Industries, Ltd. of Tokyo, Japan; BUDENE 1208, 1207, commercially available from Goodyear of Akron, Ohio; and CB BUNA® 1203G1, 1220, and 1221, commercially available from Dow Chemical Company; Europrene® NEOCIS® BR 40 and BR 60, commercially available from Polimeri Europa; and BR 01, BR 730, BR 735, BR 11, and BR 51, commercially available from Japan Synthetic Rubber Co., Ltd; and KARBOCHEM® ND40, ND45, and ND60, commercially available from Karbochem.

The base rubber may also comprise high or medium Mooney viscosity rubber, or blends thereof. A "Mooney" unit is a unit used to measure the resistance to flow of raw or unvulcanized rubber. The viscosity in a "Mooney" unit is equal to the torque, measured on an arbitrary scale, on a disk in a vessel that contains rubber at a temperature of 100° C. and rotates at two revolutions per minute. The measurement of Mooney viscosity is defined according to ASTM D-1646.

The Mooney viscosity range may be greater than about 40, or in the range of from about 40 to about 80, or in the range from about 40 to about 60. Polybutadiene rubber with higher Mooney viscosity may also be used, so long as the viscosity of the polybutadiene does not reach a level where the high viscosity polybutadiene adversely interferes with the manufacturing machinery.

Golf ball layer materials made with mid- to high-Mooney viscosity polybutadiene material can exhibit increased resiliency (and, therefore, distance) without increasing the hardness of the ball. Commercial sources of suitable mid- to high-Mooney viscosity polybutadiene include LANXESS CB23 (Nd-catalyzed), which has a Mooney viscosity of around 50 and is a highly linear polybutadiene.

If desired, the polybutadiene can also be mixed with other elastomers known in the art, such as other polybutadiene rubbers, natural rubber, styrene butadiene rubber, and/or isoprene rubber in order to further modify the properties of the core or other layer. When a mixture of elastomers is used, the amounts of other constituents in the rubber composition are typically based on 100 parts by weight of the total elastomer mixture.

In one embodiment, the base rubber comprises an Nd-catalyzed polybutadiene, a rare earth-catalyzed polybutadiene rubber, or blends thereof. If desired, the polybutadiene can also be mixed with other elastomers known in the art such as natural rubber, polyisoprene rubber and/or styrene-butadiene rubber in order to modify the properties of the core or other layer containing it. Other suitable base rubbers include thermosetting materials such as, ethylene propylene diene monomer rubber, ethylene propylene rubber, butyl rubber, halobutyl rubber, hydrogenated nitrile butadiene rubber, nitrile rubber, and silicone rubber.

Thermoplastic elastomers (TPE) may also be used to modify the properties of such a layer, or the uncured layer stock by blending with the base thermoset rubber. These TPEs include natural or synthetic balata, or high trans-polyisoprene, high trans-polybutadiene, or any styrenic block copolymer, such as styrene ethylene butadiene styrene, styrene-isoprene-styrene, etc., a metallocene or other single-site catalyzed polyolefin such as ethylene-octene, or ethylene-butene, or thermoplastic polyurethanes (TPU) including copolymers. Other suitable TPEs for blending with the thermoset rubbers of the present invention include PEBAX®, which is believed to comprise polyether amide copolymers, HYTREL®, which is believed to comprise polyether ester copolymers, thermoplastic urethane, and KRATON®, which is believed to comprise styrenic block copolymers elastomers. Any of the TPEs or TPUs above may also contain functionality suitable for grafting, including maleic acid or maleic anhydride.

Additional polymers may also optionally be incorporated into the base rubber. Examples include, but are not limited to, thermoset elastomers such as core regrind, thermoplastic vulcanizate, copolymeric ionomer, terpolymeric ionomer, polycarbonate, polyamide, copolymeric polyamide, polyesters, polyvinyl alcohols, acrylonitrile-butadiene-styrene copolymers, polyarylate, polyacrylate, polyphenylene ether, impact-modified polyphenylene ether, high impact polystyrene, diallyl phthalate polymer, styrene-acrylonitrile polymer (SAN) (including olefin-modified SAN and acrylonitrile-styrene-acrylonitrile polymer), styrene-maleic anhydride copolymer, styrenic copolymer, functionalized styrenic copolymer, functionalized styrenic terpolymer, styrenic terpolymer, cellulose polymer, liquid crystal polymer, ethylene-vinyl acetate copolymers, polyurea, and polysiloxane or any metallocene-catalyzed polymers of these species.

Suitable polyamides for use as an additional polymeric material in compositions within the scope of the present invention also include resins obtained by: (1) polycondensation of (a) a dicarboxylic acid, such as oxalic acid, adipic acid, sebacic acid, terephthalic acid, isophthalic acid, or 1,4-cyclohexanedicarboxylic acid, with (b) a diamine, such as ethylenediamine, tetramethylenediamine, pentamethylenediamine, hexamethylenediamine, or decamethylenediamine, 1,4-cyclohexanediamine, or m-xylylenediamine; (2) a ring-opening polymerization of cyclic lactam, such as $\epsilon$-caprolactam or $\Omega$-laurolactam; (3) polycondensation of an aminocarboxylic acid, such as 6-aminocaproic acid, 9-aminononanoic acid, 11-aminoundecanoic acid, or 12-aminododecanoic acid; or (4) copolymerization of a cyclic lactam with a dicarboxylic acid and a diamine. Specific examples of suitable polyamides include NYLON 6, NYLON 66, NYLON 610, NYLON 11, NYLON 12, copolymerized NYLON, NYLON MXD6, and NYLON 46.

Suitable peroxide initiating agents include dicumyl peroxide; 2,5-dimethyl-2,5-di(t-butylperoxy) hexane; 2,5-dimethyl-2,5-di(t-butylperoxy)hexyne; 2,5-dimethyl-2,5-di (benzoylperoxy)hexane; 2,2'-bis(t-butylperoxy)-di-isopropylbenzene; 1,1-bis(t-butylperoxy)-3,3,5-trimethyl cyclohexane; n-butyl 4,4-bis(t-butyl-peroxy)valerate; t-butyl perbenzoate; benzoyl peroxide; n-butyl 4,4'-bis(butylperoxy) valerate; di-t-butyl peroxide; or 2,5-di-(t-butylperoxy)-2,5-dimethyl hexane, lauryl peroxide, t-butyl hydroperoxide, $\alpha$-$\alpha$ bis(t-butylperoxy) diisopropylbenzene, di(2-t-butyl-peroxyisopropyl)benzene, di-t-amyl peroxide, di-t-butyl peroxide. Preferably, the rubber composition includes from about 0.25 to about 5.0 parts by weight peroxide per 100 parts by weight rubber (phr), more preferably 0.5 phr to 3 phr, most preferably 0.5 phr to 1.5 phr. In a most preferred embodiment, the peroxide is present in an amount of about 0.8 phr. These ranges of peroxide are given assuming the peroxide is 100% active, without accounting for any carrier that might be present. Because many commercially available peroxides are sold along with a carrier compound, the actual amount of active peroxide present must be calculated. Commercially-available peroxide initiating agents include DICUP™ family of dicumyl peroxides (including DICUP™ R, DICUP™ 40C and DICUP™ 40KE) available from ARKEMA. Similar initiating agents are available from AkroChem, Lanxess, Flexsys/Harwick and R.T. Vanderbilt. Another commercially-available and preferred initiating gent is TRIGONOX™ 265-50B from Akzo Nobel, which is a mixture of 1,1-di(t-butylperoxy)-3,3,5-trimethylcyclohexane and di(2-t-butylperoxyisopropyl) benzene. TRIGONOX™ peroxides are generally sold on a carrier compound.

Suitable reactive co-agents include, but are not limited to, metal salts of diacrylates, dimethacrylates, and monomethacrylates suitable for use in this invention include those wherein the metal is zinc, magnesium, calcium, barium, tin, aluminum, lithium, sodium, potassium, iron, zirconium, and bismuth. Zinc diacrylate (ZDA) is preferred, but the present invention is not limited thereto. ZDA provides golf balls with a high initial velocity. The ZDA can be of various grades of purity. For the purposes of this invention, the lower the quantity of zinc stearate present in the ZDA the higher the ZDA purity. ZDA containing less than about 10% zinc stearate is preferable. More preferable is ZDA containing about 4-8% zinc stearate. Suitable, commercially available zinc diacrylates include those from Cray Valley. The preferred concentrations of ZDA that can be used are about 10 phr to about 40 phr, more preferably 20 phr to about 35 phr, most preferably 25 phr to about 35 phr. In a particularly preferred embodiment, the reactive co-agent is present in an amount of about 29 phr to about 31 phr.

Additional preferred co-agents that may be used alone or in combination with those mentioned above include, but are not limited to, trimethylolpropane trimethacrylate, trimethylolpropane triacrylate, and the like. It is understood by those skilled in the art, that in the case where these co-agents may be liquids at room temperature, it may be advantageous to disperse these compounds on a suitable carrier to promote ease of incorporation in the rubber mixture.

Antioxidants are compounds that inhibit or prevent the oxidative breakdown of elastomers, and/or inhibit or prevent reactions that are promoted by oxygen radicals. Some exemplary antioxidants that may be used in the present invention include, but are not limited to, quinoline type antioxidants, amine type antioxidants, and phenolic type antioxidants. A preferred antioxidant is 2,2'-methylene-bis-(4-methyl-6-t-butylphenol) available as VANOX® MBPC from R.T. Vanderbilt. Other polyphenolic antioxidants include VANOX® T, VANOX® L, VANOX® SKT, VANOX® SWP, VANOX® 13 and VANOX® 1290.

Suitable antioxidants include, but are not limited to, alkylene-bis-alkyl substituted cresols, such as 4,4'-methylene-bis(2,5-xylenol); 4,4'-ethylidene-bis-(6-ethyl-m-cresol); 4,4'-butylidene-bis-(6-t-butyl-m-cresol); 4,4'-decylidene-bis-(6-methyl-m-cresol); 4,4'-methylene-bis-(2-amyl-m-cresol); 4,4'-propylidene-bis-(5-hexyl-m-cresol); 3,3'-decylidene-bis-(5-ethyl-p-cresol); 2,2'-butylidene-bis-(3-n-hexyl-p-cresol); 4,4'-(2-butylidene)-bis-(6-t-butyl-m-cresol); 3,3'-4(decylidene)-bis-(5-ethyl-p-cresol); (2,5-dimethyl-4-hydroxyphenyl) (2-hydroxy-3,5-dimethylphenyl) methane; (2-methyl-4-hydroxy-5-ethylphenyl) (2-ethyl-3-hydroxy-5-methylphenyl) methane; (3-methyl-5-hydroxy-6-t-butylphenyl) (2-hydroxy-4-methyl-5-decylphenyl)-n-butyl methane; (2-hydroxy-4-ethyl-5-methylphenyl) (2-decyl-3-hydroxy-4-methylphenyl)butylamylmethane; (3-ethyl-4-methyl-5-hydroxyphenyl)-(2,3-dimethyl-3-hydroxy-phenyl) nonylmethane; (3-methyl-2-hydroxy-6-ethylphenyl)-(2-isopropyl-3-hydroxy-5-methyl-phenyl)cyclohexylmethane; (2-methyl-4-hydroxy-5-methylphenyl) (2-hydroxy-3-methyl-5-ethylphenyl)dicyclohexyl methane; and the like.

Other suitable antioxidants include, but are not limited to, substituted phenols, such as 2-tert-butyl-4-methoxyphenol; 3-tert-butyl-4-methoxyphenol; 3-tert-octyl-4-methoxyphenol; 2-methyl-4-methoxyphenol; 2-stearyl-4-n-butoxyphenol; 3-t-butyl-4-stearyloxyphenol; 3-lauryl-4-ethoxyphenol; 2,5-di-t-butyl-4-methoxyphenol; 2-methyl-4-methoxyphenol; 2-(1-methycyclohexyl)-4-methoxyphenol; 2-t-butyl-4-dodecyloxyphenol; 2-(1-methylbenzyl)-4-methoxyphenol; 2-t-octyl-4-methoxyphenol; methyl gallate; n-propyl gallate; n-butyl gallate; lauryl gallate; myristyl gallate; stearyl gallate; 2,4,5-trihydroxyacetophenone; 2,4,5-trihydroxy-n-butyrophenone; 2,4,5-trihydroxystearophenone; 2,6-ditert-butyl-4-methylphenol; 2,6-ditert-octyl-4-methylphenol; 2,6-ditert-butyl-4-stearylphenol; 2-methyl-4-methyl-6-tert-butylphenol; 2,6-distearyl-4-methylphenol; 2,6-dilauryl-4-methylphenol; 2,6-di(n-octyl)-4-methylphenol; 2,6-di(n-hexadecyl)-4-methylphenol; 2,6-di(1-methylundecyl)-4-methylphenol; 2,6-di(1-methylheptadecyl)-4-methylphenol; 2,6-di(trimethylhexyl)-4-methylphenol; 2,6-di(1,1,3,3-tetramethyloctyl)-4-methylphenol; 2-n-dodecyl-6-tert butyl-4-methylphenol; 2-n-dodecyl-6-(1-methylundecyl)-4-methylphenol; 2-n-dodecyl-6-(1,1,3,3-tetramethyloctyl)-4-methylphenol; 2-n-dodecyl-6-n-octadecyl-4-methylphenol; 2-n-dodecyl-6-n-octyl-4-methylphenol; 2-methyl-6-n-octadecyl-4-methylphenol; 2-n-dodecyl-6-(1-methylheptadecyl)-4-methylphenol; 2,6-di(1-methylbenzyl)-4-methylphenol; 2,6-di(1-methylcyclohexyl)-4-methylphenol; 2,6-(1-methylcyclohexyl)-4-methylphenol; 2-(1-methylbenzyl)-4-methylphenol; and related substituted phenols.

More suitable antioxidants include, but are not limited to, alkylene bisphenols, such as 4,4'-butylidene bis(3-methyl-6-t-butyl phenol); 2,2-butylidene bis (4,6-dimethyl phenol); 2,2'-butylidene bis(4-methyl-6-t-butyl phenol); 2,2'-butylidene bis(4-t-butyl-6-methyl phenol); 2,2'-ethylidene bis(4-methyl-6-t-butylphenol); 2,2'-methylene bis(4,6-dimethyl phenol); 2,2'-methylene bis(4-methyl-6-t-butyl phenol); 2,2'-methylene bis(4-ethyl-6-t-butyl phenol); 4,4'-methylene bis(2,6-di-t-butyl phenol); 4,4'-methylene bis(2-methyl-6-t-butyl phenol); 4,4'-methylene bis(2,6-dimethyl phenol); 2,2'-methylene bis(4-t-butyl-6-phenyl phenol); 2,2'-dihydroxy-3,3',5,5'-tetramethylstilbene; 2,2'-isopropylidene bis (4-methyl-6-t-butyl phenol); ethylene bis (beta-naphthol); 1,5-dihydroxy naphthalene; 2,2'-ethylene bis (4-methyl-6-propyl phenol); 4,4'-methylene bis(2-propyl-6-t-butyl phenol); 4,4'-ethylene bis (2-methyl-6-propyl phenol); 2,2'-methylene bis(5-methyl-6-t-butyl phenol); and 4,4'-butylidene bis(6-t-butyl-3-methyl phenol);

Suitable antioxidants further include, but are not limited to, alkylene trisphenols, such as 2,6-bis (2'-hydroxy-3'-t-butyl-5'-methyl benzyl)-4-methyl phenol; 2,6-bis (2'-hydroxy-3'-t-ethyl-5'-butyl benzyl)-4-methyl phenol; and 2,6-bis(2'-hydroxy-3'-t-butyl-5'-propyl benzyl)-4-methyl phenol.

The antioxidant is typically present in an amount of about 0.1 phr to about 5 phr, preferably from about 0.1 phr to about 2 phr, more preferably about 0.1 phr to about 1 phr. In a particularly preferred embodiment, the antioxidant is present in an amount of about 0.4 phr. In an alternative embodiment, the antioxidant should be present in an amount to ensure that the hardness gradient of the inventive rubber mixture is negative. Preferably, about 0.2 phr to about 1 phr antioxidant is added to the layer (e.g., inner core, outer core layer, etc.) formulation, more preferably, about 0.3 to about 0.8 phr, and most preferably 0.4 to about 0.7 phr. Preferably, about 0.25 phr to about 1.5 phr of peroxide as calculated at 100% active can be added to the layer formulation, more preferably about 0.5 phr to about 1.2 phr, and most preferably about 0.7 phr to about 1.0 phr. The ZDA amount can be varied to suit the desired compression, spin and feel of the resulting golf ball. The cure regime can have a temperature range between from about 290° F. to about 360° F., or from about 290° F. to about 335° F., or from about 300° F. to about 325° F., or from about 330° F. to about 355° F., and the stock is held at that temperature for at least about 10 minutes to about 30 minutes.

The thermoset rubber composition may also include an optional soft and fast agent. As used herein, "soft and fast agent" means any compound or a blend thereof that that is capable of making a core or other layer be 1) be softer (lower compression) at constant COR or 2) have a higher COR at equal compression, or any combination thereof, when compared to a core/layer equivalently prepared without a soft and fast agent. Preferably, the composition of the present invention contains from about 0.05 phr to about 10.0 phr soft and fast agent. In one embodiment, the soft and fast agent is present in an amount of about 0.05 phr to about 3.0 phr, preferably about 0.05 phr to about 2.0 phr, more preferably about 0.05 phr to about 1.0 phr. In another embodiment, the soft and fast agent is present in an amount of about 2.0 phr to about 5.0 phr, preferably about 2.35 phr to about 4.0 phr, and more preferably about 2.35 phr to about 3.0 phr. In an alternative high concentration embodiment, the soft and fast agent is present in an amount of about 5.0 phr to about 10.0 phr, more preferably about 6.0 phr to about 9.0 phr, most preferably about 7.0 phr to about 8.0 phr. In a most preferred embodiment, the soft and fast agent is present in an amount of about 2.6 phr.

Suitable soft and fast agents include, but are not limited to, organosulfur or metal-containing organosulfur compounds, an organic sulfur compound, including mono, di, and polysulfides, a thiol, or mercapto compound, an inorganic sulfide compound, a Group VIA compound, or mixtures thereof. The soft and fast agent component may also be a blend of an organosulfur compound and an inorganic sulfide compound.

Suitable soft and fast agents of the present invention include, but are not limited to those having the following general formula:

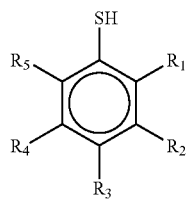

where $R_1$-$R_5$ can be $C_1$-$C_8$ alkyl groups; halogen groups; thiol groups (—SH), carboxylated groups; sulfonated groups; and hydrogen; in any order; and also pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenoland; and their zinc salts. Preferably, the halogenated thiophenol compound is pentachlorothiophenol, which is commercially available in neat form or under the tradename STRUKTOL®, a clay-based carrier containing the sulfur compound pentachlorothiophenol loaded at 45 percent (correlating to 2.4 parts PCTP). STRUKTOL® is commercially available from Struktol Company of America of Stow, Ohio. PCTP is commercially available in neat form from eChinachem of San Francisco, Calif. and in the salt form from eChinachem of San Francisco, Calif. Most preferably, the halogenated thiophenol compound is the zinc salt of pentachlorothiophenol, which is commercially available from eChinachem of San Francisco, Calif.

As used herein when referring to the invention, the term "organosulfur compound(s)" refers to any compound containing carbon, hydrogen, and sulfur, where the sulfur is directly bonded to at least 1 carbon. As used herein, the term "sulfur compound" means a compound that is elemental sulfur, polymeric sulfur, or a combination thereof. It should be further understood that the term "elemental sulfur" refers to the ring structure of $S_8$ and that "polymeric sulfur" is a structure including at least one additional sulfur relative to elemental sulfur.

Additional suitable examples of soft and fast agents (that are also believed to be cis-to-trans catalysts) include, but are not limited to, 4,4'-diphenyl disulfide; 4,4'-ditolyl disulfide; 2,2'-benzamido diphenyl disulfide; bis(2-aminophenyl) disulfide; bis(4-aminophenyl) disulfide; bis(3-aminophenyl) disulfide; 2,2'-bis(4-aminonaphthyl) disulfide; 2,2'-bis(3-aminonaphthyl) disulfide; 2,2'-bis(4-aminonaphthyl) disulfide; 2,2'-bis(5-aminonaphthyl) disulfide; 2,2'-bis(6-aminonaphthyl) disulfide; 2,2'-bis(7-aminonaphthyl) disulfide; 2,2'-bis(8-aminonaphthyl) disulfide; 1,1'-bis(2-aminonaphthyl) disulfide; 1,1'-bis(3-aminonaphthyl) disulfide; 1,1'-bis(3-aminonaphthyl) disulfide; 1,1'-bis(4-aminonaphthyl) disulfide; 1,1'-bis(5-aminonaphthyl) disulfide; 1,1'-bis(6-aminonaphthyl) disulfide; 1,1'-bis(7-aminonaphthyl) disulfide; 1,1'-bis(8-aminonaphthyl) disulfide; 1,2'-diamino-1,2'-dithiodinaphthalene; 2,3'-diamino-1,2'-dithiodinaphthalene; bis(4-chlorophenyl) disulfide; bis(2-chlorophenyl) disulfide; bis(3-chlorophenyl) disulfide; bis(4-bromophenyl) disulfide; bis(2-bromophenyl) disulfide; bis(3-bromophenyl) disulfide; bis(4-fluorophenyl) disulfide; bis(4-iodophenyl) disulfide; bis(2,5-dichlorophenyl) disulfide; bis(3,5-dichlorophenyl) disulfide; bis (2,4-dichlorophenyl) disulfide; bis(2,6-dichlorophenyl) disulfide; bis(2,5-dibromophenyl) disulfide; bis(3,5-dibromophenyl) disulfide; bis(2-chloro-5-bromophenyl) disulfide; bis(2,4,6-trichlorophenyl) disulfide; bis(2,3,4,5,6-pentachlorophenyl) disulfide; bis(4-cyanophenyl) disulfide; bis(2-cyanophenyl) disulfide; bis(4-nitrophenyl) disulfide; bis(2-nitrophenyl) disulfide; 2,2'-dithiobenzoic acid ethylester; 2,2'-dithiobenzoic acid methylester; 2,2'-dithiobenzoic acid; 4,4'-dithiobenzoic acid ethylester; bis(4-acetylphenyl) disulfide; bis(2-acetylphenyl) disulfide; bis(4-formylphenyl) disulfide; bis(4-carbamoylphenyl) disulfide; 1,1'-dinaphthyl disulfide; 2,2'-dinaphthyl disulfide; 1,2'-dinaphthyl disulfide; 2,2'-bis(1-chlorodinaphthyl) disulfide; 2,2'-bis(1-bromonaphthyl) disulfide; 1,1'-bis(2-chloronaphthyl) disulfide; 2,2'-bis(1-cyanonaphthyl) disulfide; 2,2'-bis(1-acetylnaphthyl) disulfide; and the like; or a mixture thereof. Preferred organosulfur components include 4,4'-diphenyl disulfide, 4,4'-ditolyl disulfide, or 2,2'-benzamido diphenyl disulfide, or a mixture thereof. A more preferred organosulfur component includes 4,4'-ditolyl disulfide. In another embodiment, metal-containing organosulfur components can be used according to the invention. Suitable metal-containing organosulfur components include, but are not limited to, cadmium, copper, lead, and tellurium analogs of diethyldithiocarbamate, diamyldithiocarbamate, and dimethyldithiocarbamate, or mixtures thereof.

Suitable substituted or unsubstituted aromatic organic components that do not include sulfur or a metal include, but are not limited to, 4,4'-diphenyl acetylene, azobenzene, or a mixture thereof. The aromatic organic group preferably ranges in size from $C_6$ to $C_{20}$, and more preferably from $C_6$ to $C_{10}$. Suitable inorganic sulfide components include, but are not limited to titanium sulfide, manganese sulfide, and sulfide analogs of iron, calcium, cobalt, molybdenum, tungsten, copper, selenium, yttrium, zinc, tin, and bismuth.

A substituted or unsubstituted aromatic organic compound is also suitable as a soft and fast agent. Suitable substituted or unsubstituted aromatic organic components include, but are not limited to, components having the formula $(R_1)_x$—$R_3$-M-$R_4$—$(R_2)_y$, wherein $R_1$ and $R_2$ are each hydrogen or a substituted or unsubstituted $C_{1-20}$ linear, branched, or cyclic alkyl, alkoxy, or alkylthio group, or a single, multiple, or fused ring $C_6$ to $C_{24}$ aromatic group; x and y are each an integer from 0 to 5; $R_3$ and $R_4$ are each selected from a single, multiple, or fused ring $C_6$ to $C_{24}$ aromatic group; and M includes an azo group or a metal component. $R_3$ and $R_4$ are each preferably selected from a $C_6$ to $C_{10}$ aromatic group, more preferably selected from phenyl, benzyl, naphthyl, benzamido, and benzothiazyl. $R_1$ and $R_2$ are each preferably selected from a substituted or unsubstituted $C_{1-10}$ linear, branched, or cyclic alkyl, alkoxy, or alkylthio group or a $C_6$ to $C_{10}$ aromatic group. When $R_1$, $R_2$, $R_3$, or $R_4$, are substituted, the substitution may include one or more of the following substituent groups: hydroxy and metal salts thereof; mercapto and metal salts thereof; halogen; amino, nitro, cyano, and amido; carboxyl including esters, acids, and metal salts thereof; silyl; acrylates and metal salts thereof; sulfonyl or sulfonamide; and phosphates and phosphites. When M is a metal component, it may be any suitable elemental metal available to those of ordinary skill in the art. Typically, the metal will be a transition metal, although preferably it is tellurium or selenium. In one embodiment, the aromatic organic compound is substantially free of metal, while in another embodiment the aromatic organic compound is completely free of metal.

The soft and fast agent can also include a Group VIA component. Elemental sulfur and polymeric sulfur are commercially available from Elastochem, Inc. of Chardon, Ohio. Exemplary sulfur catalyst compounds include PB(RM-S)-80 elemental sulfur and PB(CRST)-65 polymeric sulfur, each of which is available from Elastochem, Inc. An exemplary tellurium catalyst under the tradename TELLOY® and an exemplary selenium catalyst under the tradename VANDEX® are each commercially available from RT Vanderbilt.

Conventional fillers may also be included in the thermoset or thermoplastic commposition portion of the mixture to modify such properties as the specific gravity (density-modifying materials), hardness, weight, modulus, resiliency, compression, and the like may be added to the rubber composition as well as to other layer compositions of golf balls of the invention). Suitable fillers include for example clays, silicas, precipitated hydrated silica, talc, glass fibers, aramid fibers, micas, calcium metasilicate, calcium silicate, zinc sulfate, barium sulfate, zinc sulfide, lithopone, silicates, silicon carbide, tungsten carbides, carbon black, diatomaceous earth, polyvinyl chloride, carbonates (e.g., calcium carbonate, zinc carbonate, barium carbonate, and magnesium carbonate), metals (e.g., titanium, tungsten, aluminum, bismuth, nickel, molybdenum, iron, lead, copper, boron, cobalt, beryllium, zinc, and tin), metal alloys (e.g., steel, brass, bronze, boron carbide whiskers, and tungsten carbide whiskers), oxides (e.g., zinc oxide, tin oxide, iron oxide, calcium oxide, aluminum oxide, titanium dioxide, cerium oxide, magnesium oxide, and zirconium oxide), nanofillers, various foaming agents or blowing agents, regrind (recycled core material typically ground to about 30 mesh or less particle size), high-Mooney-viscosity rubber regrind and the like, polymeric, ceramic, metal, and glass microspheres, and combinations thereof.

The polybutadiene and/or any other base rubber or elastomer system may also be foamed, or filled with hollow microspheres or with expandable microspheres which expand at a set temperature during the curing process to any low specific gravity level. Other ingredients such as sulfur accelerators, e.g., tetramethylthiuram di, tri, or tetrasulfide, and/or metal-containing organosulfur components may also be used according to the invention. Suitable metal-containing organosulfur accelerators include, but are not limited to, cadmium, copper, lead, and tellurium analogs of diethyldithiocarbamate, diamyldithiocarbamate, and dimethyldithiocarbamate, or mixtures thereof. Other ingredients such as processing aids e.g., fatty acids and/or their metal salts, processing oils, dyes and pigments, as well as other additives known to one skilled in the art may also be used in the present invention in amounts sufficient to achieve the purpose for which they are typically used.

Without being bound by theory, it is believed that the percentage of double bonds in the trans configuration may be manipulated throughout a core containing at least one main-chain unsaturated rubber (i.e., polybutadiene), plastic, or elastomer resulting in a trans gradient. The trans gradient may be influenced (up or down) by changing the type and amount of cis-to-trans catalyst (or soft-and-fast agent), the type and amount of peroxide, and the type and amount of coagent in the formulation. For example, a formulation containing about 0.25 phr ZnPCTP may have a trans gradient of about 5% across the core whereas a formulation containing about 2 phr ZnPCTP may have a trans gradient of about 10%, or higher. The trans gradient may also be manipulated through the cure times and temperatures. It is believed that lower temperatures and shorter cure times yield lower trans gradients, although a combination of many of these factors may yield gradients of differing and/or opposite directions from that resulting from use of a single factor.

In general, higher and/or faster cure rates tend to yield higher levels of trans content, as do higher concentrations of peroxides, soft-and-fast agents, and, to some extent, ZDA concentration. Even the type of rubber may have an effect on trans levels, with those catalyzed by rare-earth metals, such as Nd, being able to form higher levels of trans polybutadiene compared to those rubbers formed from Group VIII metals, such as Co, Ni, and Li.

Meanwhile, the thermoset or thermoplastic portion of the inventive mixture may be a polyurethane formed from the reaction product of at least one polyisocyanate and at least one curing agent. The curing agent can include, for example, one or more diamines, one or more polyols, or a combination thereof. The at least one polyisocyanate can be combined with one or more polyols to form a prepolymer, which is then combined with the at least one curing agent. Thus, when polyols are described herein they may be suitable for use in one or both components of the polyurethane material, that is, as part of a prepolymer and in the curing agent. The curing agent includes a polyol curing agent preferably selected from the group consisting of ethylene glycol; diethylene glycol; polyethylene glycol; propylene glycol; polypropylene glycol; lower molecular weight polytetramethylene ether glycol; 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol; 1,5-pentanediol; 1,6-hexanediol; resorcinol-di-(.beta.-hydroxyethyl)ether; hydroquinone-di-(.beta.-hydroxyethyl) ether; trimethylol propane; and combinations thereof.

Suitable polyurethane polymer compositions also include those formed from the reaction product of at least one isocyanate and at least one curing agent or the reaction product of at least one isocyanate, at least one polyol, and at least one curing agent. Preferred isocyanates include those selected from the group consisting of 4,4'-diphenylmethane diisocyanate, polymeric 4,4'-diphenylmethane diisocyanate, carbodiimide-modified liquid 4,4'-diphenylmethane diisocyanate, 4,4'-dicyclohexylmethane diisocyanate, p-phenylene diisocyanate, toluene diisocyanate, isophoronediisocyanate, p-methylxylene diisocyanate, m-methylxylene diisocyanate, o-methylxylene diisocyanate, and combinations thereof. Preferred polyols include those selected from the group consisting of polyether polyol, hydroxy-terminated polybutadiene, polyester polyol, polycaprolactone polyol, polycarbonate polyol, and combinations thereof. Preferred curing agents include polyamine curing agents, polyol curing agents, and combinations thereof. Polyamine curing agents are particularly preferred. Preferred polyamine curing agents include, for example, 3,5-dimethylthio-2,4-toluenediamine, or an isomer thereof; 3,5-diethyltoluene-2, 4-diamine, or an isomer thereof; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); trimethylene glycol-di-p-aminobenzoate; polytetramethyleneoxide-di-p-aminobenzoate; N,N'-dialkyldiamino diphenyl methane; p,p'-methylene dianiline; phenylenediamine; 4,4'-methylene-bis-(2-chloroaniline); 4,4'-methylene-bis-(2,6-diethylaniline); 4,4'-diamino-3,3'-diethyl-5,5'-dimethyl diphenylmethane; 2,2',3,3'-tetrachloro diamino diphenylmethane; 4,4'-methylene-bis-(3-chloro-2,6-diethylaniline); and combinations thereof.

The composition is not limited by the use of a particular polyisocyanate. Suitable polyisocyanates include, but are not limited to, 4,4'-diphenylmethane diisocyanate ("MDI"), polymeric MDI, carbodiimide-modified liquid MDI, 4,4'-dicyclohexylmethane diisocyanate ("H$_{12}$MDI"), p-phenylene diisocyanate ("PPDI"), toluene diisocyanate ("TDI"), 3,3'-dimethyl-4,4'-biphenylene diisocyanate ("TODI"), isophoronediisocyanate ("IPDI"), hexamethylene diisocyanate ("HDI"), naphthalene diisocyanate ("NDI"); xylene diisocyanate ("XDI"); para-tetramethylxylene diisocyanate ("p-TMXDI"); meta-tetramethylxylene diisocyanate ("m-TMXDI"); ethylene diisocyanate; propylene-1,2-diisocyanate; tetramethylene-1,4-diisocyanate; cyclohexyl diisocyanate; 1,6-hexamethylene-diisocyanate ("HDI"); dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"), tetracene diisocyanate, naphthalene diisocyanate, anthracene diisocyanate; and combinations thereof. Polyisocyanates are known to those of ordinary skill in the art as having more than one isocyanate group, e.g., di-, tri-, and tetra-isocyanate. Preferably, the polyisocyanate is selected from MDI, PPDI, TDI, and combinations thereof. More preferably, the polyisocyanate includes MDI. It should be understood that, as used herein, the term "MDI" includes 4,4'-diphenylmethane diisocyanate, polymeric MDI, carbodiimide-modified liquid MDI, combinations thereof and, additionally, that the diisocyanate employed may be "low free monomer," understood by one of ordinary skill in the art to have lower levels of "free" monomer isocyanate groups than conventional diisocyanates, i.e., the compositions of the invention typically have less than about 0.1% free monomer groups. Examples of "low free monomer" diisocyanates include, but are not limited to low free monomer MDI, low free monomer TDI, and low free monomer PPDI.

The at least one polyisocyanate may for example have about 18% or less unreacted NCO groups. In some embodiments, the at least one polyisocyanate has no greater than 8.5% NCO, more preferably from 2.5% to 8.0%, or from 3.0% to 7.2%, or from 5.0% to 6.5%.

The composition is further not limited by the use of a particular polyol. In one embodiment, the molecular weight of the polyol is from about 200 to about 6000. Exemplary polyols include, but are not limited to, polyether polyols, hydroxy-terminated polybutadiene (including partially/fully hydrogenated derivatives), polyester polyols, polycaprolactone polyols, and polycarbonate polyols. Particularly preferred are polytetramethylene ether glycol ("PTMEG"), polyethylene propylene glycol, polyoxypropylene glycol, and combinations thereof. The hydrocarbon chain can have saturated or unsaturated bonds and substituted or unsubstituted aromatic and cyclic groups. Preferably, the polyol includes PTMEG. Suitable polyester polyols include, but are not limited to, polyethylene adipate glycol, polybutylene adipate glycol, polyethylene propylene adipate glycol, ortho-phthalate-1,6-hexanediol, and combinations thereof. The hydrocarbon chain can have saturated or unsaturated bonds, or substituted or unsubstituted aromatic and cyclic groups. Suitable polycaprolactone polyols include, but are not limited to 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and combinations thereof. The hydrocarbon chain can have saturated or unsaturated bonds, or substituted or unsubstituted aromatic and cyclic groups. Suitable polycarbonates include, but are not limited to, polyphthalate carbonate. The hydrocarbon chain can have saturated or unsaturated bonds, or substituted or unsubstituted aromatic and cyclic groups.

Polyamine curatives are also suitable for use in the curing agent of polyurethane compositions and have been found to improve cut, shear, and impact resistance of the resultant balls. Preferred polyamine curatives include, but are not limited to 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); polytetramethyleneoxide-di-p-aminobenzoate; N,N'-dialkyldiamino diphenyl methane; p,p'-methylene dianiline ("MDA"); m-phenylenediamine ("MPDA"); 4,4'-methylene-bis-(2-chloroaniline) ("MOCA"); 4,4'-methylene-bis-(2,6-diethylaniline); 4,4'-diamino-3,3'-diethyl-5,5'-dimethyl diphenylmethane; 2,2',3,3'-tetrachloro diamino diphenylmethane; 4,4'-methylene-bis-(3-chloro-2,6-diethylaniline); trimethylene glycol di-p-aminobenzoate; and combinations thereof. Preferably, the curing agent includes 3,5-dimethylthio-2,4-toluenediamine and isomers thereof, such as ETHACURE®300. Suitable polyamine curatives, which include both primary and secondary amines, preferably have weight average molecular weights ranging from about 64 to about 2000.

At least one of a diol, triol, tetraol, or hydroxy-terminated curative may be added to the polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy)benzene; 1,3-bis-[2-(2-hydroxyethoxy)ethoxy]benzene; 1,3-bis-{2-[2-(2-hydroxyethoxy) ethoxy]ethoxy}benzene; 1,4-butanediol; 1,5-pentanediol; 1,6-hexanediol; resorcinol-di-(4-hydroxyethyl)ether; hydroquinone-di-(4-hydroxyethyl) ether; and combinations thereof. Preferred hydroxy-terminated curatives include ethylene glycol; diethylene glycol; 1,4-butanediol; 1,5-pentanediol; 1,6-hexanediol, trimethylol propane, and combinations thereof. Preferably, the hydroxy-terminated curative has a molecular weights ranging from about 48 to 2000. It should be understood that molecular weight, as used herein, is the absolute weight average molecular weight and would be understood as such by one of ordinary skill in the art.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

Any method known to one of ordinary skill in the art may be used to combine the polyisocyanate, polyol, and curing agent. One commonly employed method, known in the art as a one-shot method, involves concurrent mixing of the polyisocyanate, polyol, and curing agent. This method results in a mixture that is inhomogeneous (more random) and affords the manufacturer less control over the molecular structure of the resultant composition. A preferred method of mixing is known as a pre-polymer method. In this method, the polyisocyanate and the polyol are mixed separately prior to addition of the curing agent. This method affords a more homogeneous mixture resulting in a more consistent polymer composition.

In the casting process, the polyurea and polyurea/urethane compositions can be formed by chain-extending the polyurea prepolymer with a single curing agent or blend of curing agents. The resulting mixture of the present invention may be castable. While thermoplastic polyurea compositions are typically formed by reacting the isocyanate blend and polyamines at a 1:1 stoichiometric ratio, thermoset compositions, on the other hand, are cross-linked polymers and are typically produced from the reaction of the isocyanate blend and polyamines at normally a 1.05:1 stoichiometric ratio.

Suitable polyurethane polymer compositions are further disclosed, for example, in U.S. Pat. Nos. 5,334,673, 6,506, 851, 6,756,436, 6,867,279, 6,960,630, and 7,105,623, the entire disclosures of which are hereby incorporated herein by reference. Suitable polyurea polymer compositions are further disclosed, for example, in U.S. Pat. Nos. 5,484,870 and 6,835,794, and U.S. Patent Application No. 60/401,047, the entire disclosures of which are hereby incorporated herein by reference. Suitable polyurethane-urea materials include polyurethane/polyurea blends and copolymers comprising urethane and urea segments, as disclosed in U.S. Patent Application Publication No. 2007/0117923, the entire disclosure of which is hereby incorporated herein by reference.

The hardness and density of the resultant layer may be targeted by varying the isocyanate, polyol, additives, or a combination thereof. The isocyanate component of the prepolymer along with the chain extender (curing agent) are collectively designated the "hard segment" and the remaining polyol component of the prepolymer is designated the "soft segment." Thus, the hardness of polyurethanes and polyureas can be controlled by changing the ratio of "hard segment" to "soft segment." As the ratio of hard segment to soft segment increases, the hardness of the resulting polyurethane increases accordingly. Conversely, as the ratio of hard segment to soft segment decreases, the hardness of the resulting polyurethane decreases. Changing the ratio of hard segment to soft segment can be achieved by increasing or decreasing the amount of diisocyanate and/or chain extender while keeping the amount of soft segment constant. Typically, this is done by increasing/decreasing the percent of isocyanate in the prepolymer.

A similar effect on hardness may be achieved by varying the molecular weight of the soft segment. For example, using a soft segment having a lower molecular weight will generally result in a polyurethane having a higher hardness compared to a polyurethane in which a higher molecular weight soft segment was used.

Another method of changing the hardness of a polyurethane or polyurea material is by changing the crosslink density of the material. Hardness of the resultant material may be increased by increasing the cros slink density and decreased by decreasing the cros slink density. Additionally, making use of di-, tri-, and tetra-functional materials may also enable one to increase or decrease hardness as desired. Soft segment functionality has some effect on resulting hardness, however, a greater effect is obtained by changing the functionality of either the isocyanate or chain extender. Crosslink density may also be increased through the use of a dual cure system, where an unsaturated polyurethane or polyurea is reacted, followed by a free radical reaction (i.e., peroxide or UV), to create cros slinks at sites of unsaturation.

Thus, materials can be designed to have different hardness values. For example, the layer may consist of an MDUPT-MEG prepolymer at an NCO level of 8% which is chain extended with dimethylthiotoluenediamine to produce a polyurethane having a hardness of 64 Shore D. Similarly, the outer cover layer may also be based on an MDUPTMEG prepolymer at an NCO level of 6% which is chain extended with dimethylthiotoluenediamine resulting in a cover layer that has a hardness of 45 Shore D, significantly softer than the intermediate layer. Alternatively, 6.5% NCO could result in a hardness of 48 Shore D, 9.0% NCO being 65.5 Shore D; and 10.0% NCO being 66.5 Shore D.

Golf balls of the invention may also include cover layers made of polymers such as ethylene, propylene, butene-1 or hexane-1 based homopolymers and copolymers including functional monomers such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(ethylene vinyl alcohol), poly(tetrafluoroethylene) and their copolymers including functional comonomers and blends thereof.

In one particular embodiment, ionomer resins can be used as the cover material. These cross-linked polymers contain inter-chain ionic bonding as well as covalent bonding. The ionomer resins include, for example, a copolymer of ethylene and an acid group such as methacrylic or acrylic acid. Metal ions such as sodium, lithium, zinc, and magnesium are used to neutralize the acid groups in the polymer. Commercially available ionomer resins are known in the industry and include numerous resins sold under the trademarks, Surlyn® (DuPont) and Escor® and Lotek® (Exxon). These ionomer resins are available in various grades and are identified based on the type of base resin, molecular weight, type of metal ion, amount of acid, degree of neutralization, additives, and other properties.

Non-limiting examples of suitable ionomers include partially neutralized ionomers, blends of two or more partially neutralized ionomers, highly neutralized ionomers, blends of two or more highly neutralized ionomers, and blends of one or more partially neutralized ionomers with one or more highly neutralized ionomers. Methods of preparing ionomers are well known, and are disclosed, for example, in U.S. Pat. No. 3,264,272, the entire disclosure of which is hereby incorporated herein by reference. The acid copolymer can be a direct copolymer wherein the polymer is polymerized by adding all monomers simultaneously, as disclosed, for example, in U.S. Pat. No. 4,351,931, the entire disclosure of which is hereby incorporated herein by reference. Alternatively, the acid copolymer can be a graft copolymer wherein a monomer is grafted onto an existing polymer, as disclosed, for example, in U.S. Patent Application Publication No. 2002/0013413, the entire disclosure of which is hereby incorporated herein by reference.

Examples of suitable partially neutralized acid polymers include, but are not limited to, Surlyn® ionomers, commercially available from E. I. du Pont de Nemours and Company; AClyn® ionomers, commercially available from Honeywell International Inc.; and Lotek® ionomers, commercially available from Exxon Mobil Chemical Company. Some suitable examples of highly neutralized ionomers (HNP) are DuPont® HPF 1000 and DuPont® HPF 2000, ionomeric materials commercially available from E. I. du Pont de Nemours and Company. In some embodiments, very low modulus ionomer-("VLMI-") type ethylene-acid polymers are particularly suitable for forming the HNP, such as Surlyn® 6320, Surlyn® 8120, Surlyn® 8320, and Surlyn® 9320, commercially available from E. I. du Pont de Nemours and Company.

Any or each of core layers, intermediate/casing layers, and cover layers may be formed from ionomeric materials including blends of ionomers such as blends of HNP materials. The acid moieties of the HNP's, typically ethylene-based ionomers, are preferably neutralized greater than about 70%, more preferably greater than about 90%, and most preferably at least about 100%. The HNP's can be also be blended with a second polymer component, which, if containing an acid group, may also be neutralized. The second polymer component, which may be partially or fully neutralized, may comprise for example ionomeric copolymers and terpolymers, ionomer precursors, thermoplastics, polyamides, polycarbonates, polyesters, polyurethanes, polyureas, polyurethane/urea hybrids, thermoplastic elastomers, polybutadiene rubber, balata, metallocene-catalyzed polymers (grafted and non-grafted), single-site polymers, high-crystalline acid polymers, cationic ionomers, and the like. HNP's typically have a material hardness of between about 20 and about 80 Shore D, and a flexural modulus of between about 3,000 psi and about 200,000 psi.

Additional suitable materials for golf ball layers include conventional polyurethanes; conventional polyureas; conventional copolymers and hybrids of polyurethane and polyurea; polyethylene, including, for example, low density polyethylene, linear low density polyethylene, and high density polyethylene; polypropylene; rubber-toughened olefin polymers; acid copolymers, e.g., (meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; ethylene vinyl acetates; ethylene methyl acrylates; polyvinyl chloride resins; polyamides, amide-ester elastomers, and graft copolymers of ionomer and polyamide, including, for example, Pebax® thermoplastic polyether block amides, commercially available from Arkema Inc; crosslinked trans-polyisoprene and blends thereof; polyester-based thermoplastic elastomers, such as Hytrel®, commercially available from E. I. du Pont de Nemours and Company; polyurethane-based thermoplastic elastomers, such as Elastollan®, commercially available from BASF; synthetic or natural vulcanized rubber; and combinations thereof.

Examples of yet other materials which may be suitable for incorporating and coordinating in order to target and achieve desired playing characteristics or feel include plasticized thermoplastics, polyalkenamer compositions, polyester-based thermoplastic elastomers containing plasticizers, transparent or plasticized polyamides, thiolene compositions, polyamide and anhydride-modified polyolefins, organic acid-modified polymers, and the like.

The thermoset or thermoplastic composition portion of the inventive mixture may additionally or alternatively include any polymer composition disclosed herein as suitable for cores, intermediate layers, covers and/or coatings.

Golf balls of the invention may have any known overall diameter and any known number of different layers and layer thicknesses, wherein the inventive mixture is incorporated in one or more of those layers in order to target desired playing characteristics as long as the finished golf ball has a CoR of at least about 0.700 and golf ball compression of at least about 50.

For example, the core may have a diameter ranging from about 0.09 inches to about 1.65 inches. In one embodiment, the diameter of the core of the present invention is about 1.2 inches to about 1.630 inches. When part of a two-piece ball according to invention, the core may have a diameter ranging from about 1.5 inches to about 1.62 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches, preferably about 1.55 inches to about 1.60 inches.

In some embodiments, the core may have an overall diameter within a range having a lower limit of 0.500 or 0.700 or 0.750 or 0.800 or 0.850 or 0.900 or 0.950 or 1.000 or 1.100 or 1.150 or 1.200 or 1.250 or 1.300 or 1.350 or 1.400 or 1.450 or 1.500 or 1.600 or 1.610 inches and an upper limit of 1.620 or 1.630 or 1.640 inches. In a particular embodiment, the core is a multi-layer core having an overall diameter within a range having a lower limit of 0.500 or 0.700 or 0.750 or 0.800 or 0.850 or 0.900 or 0.950 or 1.000 or 1.100 or 1.150 or 1.200 inches and an upper limit of 1.250 or 1.300 or 1.350 or 1.400 or 1.450 or 1.500 or 1.600 or 1.610 or 1.620 or 1.630 or 1.640 inches. In another particular embodiment, the multi-layer core has an overall diameter within a range having a lower limit of 0.500 or 0.700 or 0.750 inches and an upper limit of 0.800 or 0.850 or 0.900 or 0.950 or 1.000 or 1.100 or 1.150 or 1.200 or 1.250 or 1.300 or 1.350 or 1.400 or 1.450 or 1.500 or 1.600 or 1.610 or 1.620 or 1.630 or 1.640 inches. In another particular embodiment, the multi-layer core has an overall diameter of 1.500 inches or 1.510 inches or 1.530 inches or 1.550 inches or 1.570 inches or 1.580 inches or 1.590 inches or 1.600 inches or 1.610 inches or 1.620 inches.

In some embodiments, the inner core can have an overall diameter of 0.500 inches or greater, or 0.700 inches or greater, or 1.00 inches or greater, or 1.250 inches or greater, or 1.350 inches or greater, or 1.390 inches or greater, or 1.450 inches or greater, or an overall diameter within a range having a lower limit of 0.250 or 0.500 or 0.750 or 1.000 or 1.250 or 1.350 or 1.390 or 1.400 or 1.440 inches and an upper limit of 1.460 or 1.490 or 1.500 or 1.550 or 1.580 or 1.600 inches, or an overall diameter within a range having a lower limit of 0.250 or 0.300 or 0.350 or 0.400 or 0.500 or 0.550 or 0.600 or 0.650 or 0.700 inches and an upper limit of 0.750 or 0.800 or 0.900 or 0.950 or 1.000 or 1.100 or 1.150 or 1.200 or 1.250 or 1.300 or 1.350 or 1.400 inches.

In some embodiments, the outer core layer can have an overall thickness within a range having a lower limit of 0.010 or 0.020 or 0.025 or 0.030 or 0.035 inches and an upper limit of 0.040 or 0.070 or 0.075 or 0.080 or 0.100 or 0.150 inches, or an overall thickness within a range having a lower limit of 0.025 or 0.050 or 0.100 or 0.150 or 0.160 or 0.170 or 0.200 inches and an upper limit of 0.225 or 0.250 or 0.275 or 0.300 or 0.325 or 0.350 or 0.400 or 0.450 or greater than 0.450 inches. The outer core layer may alternatively have a thickness of greater than 0.10 inches, or 0.20 inches or greater, or greater than 0.20 inches, or 0.30 inches or greater, or greater than 0.30 inches, or 0.35 inches or greater, or greater than 0.35 inches, or 0.40 inches or greater, or greater than 0.40 inches, or 0.45 inches or greater, or greater than 0.45 inches, or a thickness within a range having a lower limit of 0.005 or 0.010 or 0.015 or 0.020 or 0.025 or 0.030 or 0.035 or 0.040 or 0.045 or 0.050 or 0.055 or 0.060 or 0.065 or 0.070 or 0.075 or 0.080 or 0.090 or 0.100 or 0.200 or 0.250 inches and an upper limit of 0.300 or 0.350 or 0.400 or 0.450 or 0.500 or 0.750 inches.

An intermediate core layer can have an overall thickness within a range having a lower limit of 0.005 or 0.010 or 0.015 or 0.020 or 0.025 or 0.030 or 0.035 or 0.040 or 0.045 inches and an upper limit of 0.050 or 0.055 or 0.060 or 0.065 or 0.070 or 0.075 or 0.080 or 0.090 or 0.100 inches.

The cores and core layers of golf balls of the invention may have varying hardnesses depending on the particular golf ball construction and playing characteristics being targeted. Core center and/or layer hardness can range, for example, from 35 Shore C to about 98 Shore C, or 50 Shore C to about 90 Shore C, or 60 Shore C to about 85 Shore C, or 45 Shore C to about 75 Shore C, or 40 Shore C to about 85 Shore C. In other embodiments, core center and/or layer hardness can range, for example, from about 20 Shore D to about 78 Shore D, or from about 30 Shore D to about 60 Shore D, or from about 40 Shore D to about 50 Shore D, or 50 Shore D or less, or greater than 50 Shore D.

The compression of the core is generally overall in the range of about 40 to about 110, although embodiments are envisioned wherein the compression of the core is as low as 5. In other embodiments, the overall CoR of cores of the present invention at 125 ft/s is at least 0.750, or at least 0.775 or at least 0.780, or at least 0.785, or at least 0.790, or at least 0.795, or at least 0.800. Cores are also known to comprise rubbers and also may be formed of a variety of other materials that are typically also used for intermediate and cover layers. Intermediate layers may likewise also comprise materials generally used in cores and covers as described herein for example.

An intermediate layer is sometimes thought of as including any layer(s) disposed between the inner core (or center) and the outer cover of a golf ball, and thus in some embodiments, the intermediate layer may include an outer core layer, a casing layer, or inner cover layer(s). In this regard, a golf ball of the invention may include one or more intermediate layers. An intermediate layer may be used, if desired, with a multilayer cover or a multilayer core, or with both a multilayer cover and a multilayer core.

In one non-limiting embodiment, an intermediate layer having a thickness of about 0.010 inches to about 0.06 inches, is disposed about a core having a diameter ranging from about 1.5 inches to about 1.59 inches.

Intermediate layer(s) may be formed, at least in part, from one or more homopolymeric or copolymeric materials, such as ionomers, primarily or fully non-ionomeric thermoplastic materials, vinyl resins, polyolefins, polyurethanes, polyureas, polyamides, acrylic resins and blends thereof, olefinic thermoplastic rubbers, block copolymers of styrene and butadiene, isoprene or ethylene-butylene rubber, copoly (ether-amide), polyphenylene oxide resins or blends thereof, and thermoplastic polyesters. However, embodiments are envisioned wherein at least one intermediate layer is formed from a different material commonly used in a core and/or cover layer.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the present invention, the intermediate layer, or inner cover layer, may have a thickness about 0.3 inches or less. In one embodiment, the thickness of the intermediate layer is from about 0.002 inches to about 0.1 inches, and preferably about 0.01 inches or greater. For example, when part of a three-piece ball or multi-layer ball according to the invention, the intermediate layer and/or inner cover layer may have a thickness ranging from about 0.010 inches to about 0.06 inches. In another embodiment, the intermediate layer thickness is about 0.05 inches or less, or about 0.01 inches to about 0.045 inches for example.

The cover typically has a thickness to provide sufficient strength, good performance characteristics, and durability. In one embodiment, the cover thickness may for example be from about 0.02 inches to about 0.12 inches, or about 0.1 inches or less. For example, the cover may be part of a two-piece golf ball and have a thickness ranging from about 0.03 inches to about 0.09 inches. In another embodiment, the cover thickness may be about 0.05 inches or less, or from about 0.02 inches to about 0.05 inches, or from about 0.02 inches and about 0.045 inches.

The cover may be a single-, dual-, or multi-layer cover and have an overall thickness for example within a range having a lower limit of 0.010 or 0.020 or 0.025 or 0.030 or 0.040 or 0.045 inches and an upper limit of 0.050 or 0.060 or 0.070 or 0.075 or 0.080 or 0.090 or 0.100 or 0.150 or 0.200 or 0.300 or 0.500 inches. In a particular embodiment, the cover may be a single layer having a thickness of from 0.010 or 0.020 or 0.025 inches to 0.035 or 0.040 or 0.050 inches. In another particular embodiment, the cover may consist of an inner cover layer having a thickness of from 0.010 or 0.020 or 0.025 inches to 0.035 or 0.050 inches and an outer cover layer having a thickness of from 0.010 or 0.020 or 0.025 inches to 0.035 or 0.040 inches.

In one embodiment, the cover may be a single layer having a surface hardness for example of 60 Shore D or greater, or 65 Shore D or greater. In a particular aspect of this embodiment, the cover is formed from a composition having a material hardness of 60 Shore D or greater, or 65 Shore D or greater.

In another particular embodiment, the cover may be a single layer having a thickness of from 0.010 or 0.020 inches to 0.035 or 0.050 inches and formed from an ionomeric composition having a material hardness of from 60 or 62 or 65 Shore D to 65 or 70 or 72 Shore D.

In yet another particular embodiment, the cover is a single layer having a thickness of from 0.010 or 0.025 inches to 0.035 or 0.040 inches and formed from a thermoplastic composition selected from ionomer-, polyurethane-, and polyurea-based compositions having a material hardness of 62 Shore D or less, or less than 62 Shore D, or 60 Shore D or less, or less than 60 Shore D, or 55 Shore D or less, or less than 55 Shore D.

In still another particular embodiment, the cover is a single layer having a thickness of from 0.010 or 0.025 inches to 0.035 or 0.040 inches and formed from a thermosetting polyurethane- or polyurea-based composition having a material hardness of 62 Shore D or less, or less than 62 Shore D, or 60 Shore D or less, or less than 60 Shore D, or 55 Shore D or less, or less than 55 Shore D.

In an alternative embodiment, the cover may comprise an inner cover layer formed from an ionomeric composition and an outer cover layer formed from a thermosetting polyurethane- or polyurea-based composition. The inner cover layer composition may have a material hardness of from 60 or 62 or 65 Shore D to 65 or 70 or 72 Shore D. The inner cover layer may have a thickness within a range having a lower limit of 0.010 or 0.020 or 0.030 inches and an upper limit of 0.035 or 0.040 or 0.050 inches. The outer cover layer composition may have a material hardness of 62 Shore D or less, or less than 62 Shore D, or 60 Shore D or less, or less than 60 Shore D, or 55 Shore D or less, or less than 55 Shore D. The outer cover layer may have a thickness within a range having a lower limit of 0.010 or 0.020 or 0.025 inches and an upper limit of 0.035 or 0.040 or 0.050 inches.

In another embodiment, the cover may comprise an inner cover layer formed from an ionomeric composition and an outer cover layer formed from a thermoplastic composition selected from ionomer-, polyurethane-, and polyurea-based compositions. The inner cover layer composition may have a material hardness of from 60 or 62 or 65 Shore D to 65 or 70 or 72 Shore D. The inner cover layer may have a thickness within a range having a lower limit of 0.010 or 0.020 or 0.030 inches and an upper limit of 0.035 or 0.040 or 0.050 inches. The outer cover layer composition may have a material hardness of 62 Shore D or less, or less than 62 Shore D, or 60 Shore D or less, or less than 60 Shore D, or 55 Shore D or less, or less than 55 Shore D. The outer cover layer may have a thickness within a range having a lower limit of 0.010 or 0.020 or 0.025 inches and an upper limit of 0.035 or 0.040 or 0.050 inches.

In yet another embodiment, the cover is a dual- or multi-layer cover including an inner or intermediate cover layer formed from an ionomeric composition and an outer cover layer formed from a polyurethane- or polyurea-based composition. The ionomeric layer may have a surface hardness of 70 Shore D or less, or 65 Shore D or less, or less than 65 Shore D, or a Shore D hardness of from 50 to 65, or a Shore D hardness of from 57 to 60, or a Shore D hardness of 58, and a thickness within a range having a lower limit of 0.010 or 0.020 or 0.030 inches and an upper limit of 0.045 or 0.080 or 0.120 inches. The outer cover layer may be formed from a castable or reaction injection moldable polyurethane, polyurea, or copolymer or hybrid of polyurethane/polyurea. Such cover material may be thermosetting, but may be thermoplastic in other embodiments. The outer cover layer composition may have a material hardness of 85 Shore C or less, or 45 Shore D or less, or 40 Shore D or less, or from 25 Shore D to 40 Shore D, or from 30 Shore D to 40 Shore D. The outer cover layer may have a surface hardness within a range having a lower limit of 20 or 30 or 35 or 40 Shore D and an upper limit of 52 or 58 or 60 or 65 or 70 or 72 or 75 Shore D. The outer cover layer may have a thickness within a range having a lower limit of 0.010 or 0.015 or 0.025 inches and an upper limit of 0.035 or 0.040 or 0.045 or 0.050 or 0.055 or 0.075 or 0.080 or 0.115 inches.

All this being said, embodiments are also envisioned wherein one or more cover layer is formed from a material typically incorporated in a core or intermediate layer.

It is envisioned that golf balls of the invention may also incorporate conventional coating layer(s) for the purposes usually incorporated. For example, one or more coating layer may have a combined thickness of from about 0.1 μm to about 100 μm, or from about 2 μm to about 50 μm, or from about 2 μm to about 30 μm. Meanwhile, each coating layer may have a thickness of from about 0.1 μm to about 50 μm, or from about 0.1 μm to about 25 μm, or from about 0.1 μm to about 14 μm, or from about 2 μm to about 9 μm, for example.

It is envisioned that layers a golf ball of the invention may be incorporated via any of casting, compression molding, injection molding, or thermoforming. Thermoset materials are typically formed into golf ball layers by conventional reaction injection molding and compression molding techniques as well as casting, whereas thermoplastic materials are generally formed into golf ball layers by conventional compression or injection molding techniques.

A compression molding mold typically has a mold cavity formed in a pair of hemispherical molds, into which the subassembly may be placed. A combination of heat and pressure is then applied, and results in the half shells being fused to the outer surface of the subassembly as a unitary one-piece layer about the subassembly.

When injection molding is used to form a golf ball layer, the layer composition is typically in a pelletized or granulated form that can be easily fed into the throat of an injection molding machine wherein it is melted and conveyed via a screw in a heated barrel at temperatures of from about 150° F. to about 600° F., preferably from about 200° F. to about 500° F. The molten composition is ultimately injected into a closed mold cavity, which may be cooled, at ambient or at an elevated temperature, but typically the mold is cooled to a temperature of from about 50° F. to about 70° F. After residing in the closed mold for a time of from 1 second to 300 seconds, preferably from 20 seconds to 120 seconds, the core and/or core plus one or more additional core or other layers is removed from the mold and either allowed to cool at ambient or reduced temperatures or is placed in a cooling fluid such as water, ice water, dry ice in a solvent, or the like.

In the present invention, "compression" is measured according to a known procedure, using an Atti compression test device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Cores having a very low stiffness will not cause the spring to deflect by more than 1.25 mm and therefore have a zero compression measurement. The Atti compression tester is designed to measure objects having a diameter of 1.680 inches; thus, smaller objects, such as golf ball cores, must be shimmed to a total height of 1.680 inches to obtain an accurate reading. Conversion from Atti compression to Riehle (cores), Riehle (balls), 100 kg deflection, 130-10 kg deflection or effective modulus can be carried out according to the formulas given in J. Dalton.

In a golf ball if the invention, Coefficient of Restitution or CoR is determined according to a known procedure, wherein a golf ball or golf ball subassembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. CoR is then calculated as the ratio of the outgoing transit time period to the incoming transit time period, $CoR=V_{out}/V_{in}=T_{in}/T_{out}$. The CoR value can be targeted, for example, by varying the core peroxide and antioxidant types and amounts as well as the cure temperature and duration.

The surface hardness of a golf ball layer is obtained from the average of a number of measurements taken from opposing hemispheres, taking care to avoid making measurements on the parting line of the core or on surface defects such as holes or protrusions. Hardness measurements are made pursuant to ASTM D-2240 "Indentation Hardness of Rubber and Plastic by Means of a Durometer." Because of the curved surface of the golf ball layer, care must be taken to ensure that the golf ball or golf ball subassembly is centered under the durometer indentor before a surface hardness reading is obtained. A calibrated digital durometer, capable of reading to 0.1 hardness units, is used for all hardness measurements. The digital durometer must be attached to and its foot made parallel to the base of an automatic stand. The weight on the durometer and attack rate conforms to ASTM D-2240. It should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other.

Thermoset and thermoplastic layers herein may be treated in such a manner as to create a positive or negative hardness gradient. In golf ball layers of the present invention wherein a thermosetting rubber is used, gradient-producing processes and/or gradient-producing rubber formulation may be employed. Gradient-producing processes and formulations are disclosed more fully, for example, in U.S. patent application Ser. No. 12/048,665, filed on Mar. 14, 2008; Ser. No. 11/829,461, filed on Jul. 27, 2007; Ser. No. 11/772,903, filed Jul. 3, 2007; Ser. No. 11/832,163, filed Aug. 1, 2007; Ser. No. 11/832,197, filed on Aug. 1, 2007; the entire disclosure of each of these references is hereby incorporated herein by reference.

It is understood that the golf balls of the invention, incorporating at least one layer od inventive mixture, as described and illustrated herein represent only some of the many embodiments of the invention. It is appreciated by those skilled in the art that various changes and additions can be made to such golf balls without departing from the spirit and scope of this invention. It is intended that all such embodiments be covered by the appended claims.

A golf ball of the invention may further incorporate indicia, which as used herein, is considered to mean any symbol, letter, group of letters, design, or the like, that can be added to the dimpled surface of a golf ball.

Golf balls of the present invention will typically have dimple coverage of 60% or greater, preferably 65% or greater, and more preferably 75% or greater. It will be appreciated that any known dimple pattern may be used with any number of dimples having any shape or size. For example, the number of dimples may be 252 to 456, or 330 to 392 and may comprise any width, depth, and edge angle. The parting line configuration of said pattern may be either a straight line or a staggered wave parting line (SWPL), for example.

In any of these embodiments the single-layer core may be replaced with a two or more layer core wherein at least one core layer has a hardness gradient.

Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

Although the golf ball of the invention has been described herein with reference to particular means and materials, it is to be understood that the invention is not limited to the particulars disclosed and extends to all equivalents within the scope of the claims.

What is claimed is:

1. A golf ball having a CoR of at least 0.700 and a compression of at least 50 and comprising at least one layer consisting of a mixture of thermoset or thermoplastic composition and a plurality of conductive nanoshelled structures that are hexagon-shaped.

2. The golf ball of claim 1, wherein the conductive nanoshelled structures are conductive hollow nanoshells.

3. The golf ball of claim 2, wherein the plurality of conductive nanoshelled structures is included in the mixture in an amount of from about 2 wt % to about 50 wt % of the total weight of the mixture.

4. The golf ball of claim 2, wherein the plurality of conductive nanoshelled structures is included in the mixture in an amount of from about 2 wt % to about 10 wt % of the total weight of the mixture.

5. The golf ball of claim 2, wherein the plurality of conductive nanoshelled structures is included in the mixture in an amount of from about 10 wt % to about 35 wt % of the total weight of the mixture.

6. The golf ball of claim 2, wherein the plurality of conductive nanoshelled structures is included in the mixture in an amount of from about 25 wt % to about 75 wt % of the total weight of the mixture.

7. The golf ball of claim 2, wherein the plurality of conductive nanoshelled structures is included in the mixture in an amount of from 55 wt % to about 75 wt % of the total weight of the mixture.

8. The golf ball of claim 2, wherein each conductive nanoshelled structure has a diameter, at its widest cross-section, of up to 1000 nm.

9. The golf ball of claim 2, wherein each conductive hollow nanoshell has a shell thickness to longitudinal diameter ratio of from about 1:3 to about 1:100.

10. The golf ball of claim 2, wherein the mixture has a specific gravity that is less than a specific gravity of the thermoset or thermoplastic composition.

11. The golf ball of claim 2, wherein at least half of the conductive nanoshelled structures have a shell having uniform thickness.

12. The golf ball of claim 2, wherein at least half of the conductive nanoshelled structures have a shell having non-uniform thickness.

13. The golf ball of claim 2, wherein the thermoset or thermoplastic composition consists of an acid functional polymer-based ionomer and the conductive nanoshelled structures have surface cations selected from the group consisting of zinc, sodium, magnesium, lithium, potassium, and combinations thereof.

14. The golf ball of claim 13, wherein the at least one layer comprises an intermediate layer having a Shore D hardness of from about 30 to about 78.

15. The golf ball of claim 1, wherein each conductive nanoshelled structure has a diameter, at its widest cross-section, of from about 100 nm to about 800 nm.

* * * * *